(12) United States Patent
Turney et al.

(10) Patent No.: US 11,236,917 B2
(45) Date of Patent: Feb. 1, 2022

(54) BUILDING CONTROL SYSTEM WITH ZONE GROUPING BASED ON PREDICTIVE MODELS

(71) Applicant: Johnson Controls Technology Company, Auburn Hills, MI (US)

(72) Inventors: Robert D. Turney, Watertown, WI (US); Michael J. Wenzel, Grafton, WI (US); Mohammad N. Elbsat, Milwaukee, WI (US); Anas W. I. Alanqar, Milwaukee, WI (US); John H. Burroughs, Wauwatosa, WI (US); Andrew J. Przybylski, Franksville, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 54 days.

(21) Appl. No.: 16/719,638

(22) Filed: Dec. 18, 2019

(65) Prior Publication Data

US 2021/0190349 A1    Jun. 24, 2021

(51) Int. Cl.
*F24F 11/30* (2018.01)
*F24F 11/56* (2018.01)
(Continued)

(52) U.S. Cl.
CPC .............. *F24F 11/30* (2018.01); *F24F 11/56* (2018.01); *F24F 11/64* (2018.01); *F24F 11/65* (2018.01);
(Continued)

(58) Field of Classification Search
CPC .. F24F 11/30; F24F 11/65; F24F 11/56; F24F 11/64; F24F 2110/10; G05B 13/048; G05B 2219/2614; G05B 15/02
See application file for complete search history.

(56) References Cited

U.S. PATENT DOCUMENTS

| 8,370,280 B1 | 2/2013 | Lin et al. |
| 9,355,069 B2 | 5/2016 | Elbsat et al. |

(Continued)

FOREIGN PATENT DOCUMENTS

WO    WO-2018/005760 A1    1/2018

OTHER PUBLICATIONS

U.S. Appl. No. 16/418,715, filed May 21, 2019, Johnson Controls Technology Company.
(Continued)

*Primary Examiner* — Ramesh B Patel
(74) *Attorney, Agent, or Firm* — Foley & Lardner LLP

(57) ABSTRACT

A controller for operating building equipment of a building. The controller includes one or more processors. The controller includes one or more non-transitory computer-readable media storing instructions that, when executed by the one or more processors, cause the one or more processors to perform operations. The operations include comparing one or more model parameters of predictive models describing zones of the building to determine one or more zone groups for the building. The operations include generating one or more zone group models corresponding to the one or more zone groups. The operations include operating the building equipment using the one or more zone group models to affect a variable state or condition of the building.

20 Claims, 19 Drawing Sheets

(51) Int. Cl.
   *F24F 11/64*    (2018.01)
   *F24F 11/65*    (2018.01)
   *G05B 13/04*    (2006.01)
   *F24F 110/10*   (2018.01)

(52) U.S. Cl.
   CPC ........ *G05B 13/048* (2013.01); *F24F 2110/10* (2018.01)

(56) References Cited

U.S. PATENT DOCUMENTS

| | | | |
|---|---|---|---|
| 9,639,072 | B2 | 5/2017 | Burke |
| 10,564,612 | B2* | 2/2020 | Patel ........................ F24F 11/62 |
| 2014/0365017 | A1* | 12/2014 | Hanna ....................... F24F 11/30 700/276 |
| 2015/0178421 | A1* | 6/2015 | Borrelli ................... G06F 30/20 703/7 |
| 2016/0098022 | A1* | 4/2016 | Wenzel ............. G05B 13/0265 700/275 |
| 2017/0030598 | A1* | 2/2017 | Burns ................... F24F 1/0007 |
| 2017/0176036 | A1 | 6/2017 | Macek et al. |
| 2018/0004173 | A1* | 1/2018 | Patel ..................... G05B 13/048 |
| 2018/0113482 | A1 | 4/2018 | Vitullo |
| 2018/0320658 | A1 | 11/2018 | Herzog et al. |
| 2019/0011146 | A1* | 1/2019 | Seo .......................... F24F 11/63 |
| 2019/0257544 | A1 | 8/2019 | Alanqar et al. |
| 2019/0287147 | A1 | 9/2019 | Ingale et al. |
| 2019/0316802 | A1 | 10/2019 | Alanqar et al. |

OTHER PUBLICATIONS

U.S. Appl. No. 16/442,103, filed Jun. 14, 2019, Johnson Controls Technology Company.
U.S. Appl. No. 16/512,712, filed Jul. 16, 2019, Johnson Controls Technology Company.

\* cited by examiner

BUILDING CONTROL SYSTEM WITH ZONE GROUPING BASED ON PREDICTIVE MODELS

BACKGROUND

The present disclosure relates generally to control systems for buildings. The present disclosure relates more particularly to models for operating building equipment of buildings.

System identification refers to the determination of a model that describes a system. For example, system identification may be used to identify a system describing environmental conditions. Because the physical phenomena that govern such systems are often complex, nonlinear, and poorly understood, system identification requires the determination of model parameters based on measured and recorded data from the real system in order to generate an accurate predictive model. However, if too many predictive models are generated for different aspects of a system, processing inefficiencies can occur as many models are being utilized to generate many solutions. Processing inefficiencies can result in delays in operating equipment of the system, additional costs, and other undesirable effects.

SUMMARY

One implementation of the present disclosure is a controller for operating building equipment of a building, according to some embodiments. The controller includes one or more processors, according to some embodiments. The controller includes one or more non-transitory computer-readable media storing instructions that, when executed by the one or more processors, cause the one or more processors to perform operations, according to some embodiments. The operations include comparing one or more model parameters of predictive models describing zones of the building to determine one or more zone groups for the building, according to some embodiments. The operations include generating one or more zone group models corresponding to the one or more zone groups, according to some embodiments. The operations include operating the building equipment using the one or more zone group models to affect a variable state or condition of the building, according to some embodiments.

In some embodiments, the operations include identifying the predictive models by performing system identification processes based on building information describing the building.

In some embodiments, generating the one or more zone group models includes aggregating model parameters of predictive models associated with the zones of the building to generate an aggregate value of each model parameter.

In some embodiments, generating the one or more zone group models includes performing one or more system identification processes to identify the one or more zone group models.

In some embodiments, the operations include determining whether to group the one or more zone groups by comparing one or more model parameters of the one or more zone group models. The operations include, in response to a determination to group the one or more zone groups, aggregating the one or more model parameters of the one or more zone group models to generate one or more new zone group models for the building, according to some embodiments.

In some embodiments, the one or more model parameters include at least one of thermal model parameters, a cooling or heating mode, an internal heat disturbance, or a parameter derived from the one or more model parameters.

In some embodiments, comparing the one or more model parameters includes at least one of calculating a standard deviation of values of the one or more model parameters or performing a clustering analysis on the values of the one or more model parameters.

Another implementation of the present disclosure is a method for operating building equipment of a building, according to some embodiments. The method includes comparing one or more model parameters of predictive models describing zones of the building to determine one or more zone groups for the building, according to some embodiments. The method includes generating one or more zone group models corresponding to the one or more zone groups, according to some embodiments. The method includes operating the building equipment using the one or more zone group models to affect a variable state or condition of the building, according to some embodiments.

In some embodiments, the method includes identifying the predictive models by performing system identification processes based on building information describing the building.

In some embodiments, generating the one or more zone group models includes aggregating model parameters of predictive models associated with the zones of the building to generate an aggregate value of each model parameter.

In some embodiments, generating the one or more zone group models includes performing one or more system identification processes to identify the one or more zone group models.

In some embodiments, the method includes determining whether to group the one or more zone groups by comparing one or more model parameters of the one or more zone group models. The method includes, in response to a determination to group the one or more zone groups, aggregating the one or more model parameters of the one or more zone group models to generate one or more new zone group models for the building.

In some embodiments, the one or more model parameters include at least one of thermal model parameters, a cooling or heating mode, an internal heat disturbance, or a parameter derived from the one or more model parameters.

In some embodiments, comparing the one or more model parameters includes at least one of calculating a standard deviation of values of the one or more model parameters or performing a clustering analysis on the values of the one or more model parameters.

Another implementation of the present disclosure is a controller for building equipment, according to some embodiments. The controller includes a processing circuit configured to perform operations, according to some embodiments. The operations include identifying a zone group including zones of a building, according to some embodiments. The operations include extracting model parameters from zone-specific predictive models associated with individual zones of the zone group, according to some embodiments. The operations include generating a zone group model for the zone group by aggregating the model parameters of the zone-specific predictive models, according to some embodiments. The operations include operating the building equipment using the zone group model to affect a variable state or condition of the building, according to some embodiments.

In some embodiments, the operations include generating the zone-specific predictive models by performing system identification processes based on building information describing the building.

In some embodiments, identifying the zone group includes receiving grouping selections made by a user from a user device. Identifying the zone group includes forming the zone group as indicated by the grouping selections, according to some embodiments.

In some embodiments, identifying the zone group includes obtaining real-time data describing the zones. Identifying the zone group includes forming the zone group based on the real-time data, according to some embodiments.

In some embodiments, the real-time data includes at least one of model predictive control setpoints, a cooling or heating mode, bounds for the zones, or occupancy information.

In some embodiments, identifying the zone group includes comparing model parameters of zone-specific predictive models to determine which of the zones exhibit similar behaviors.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
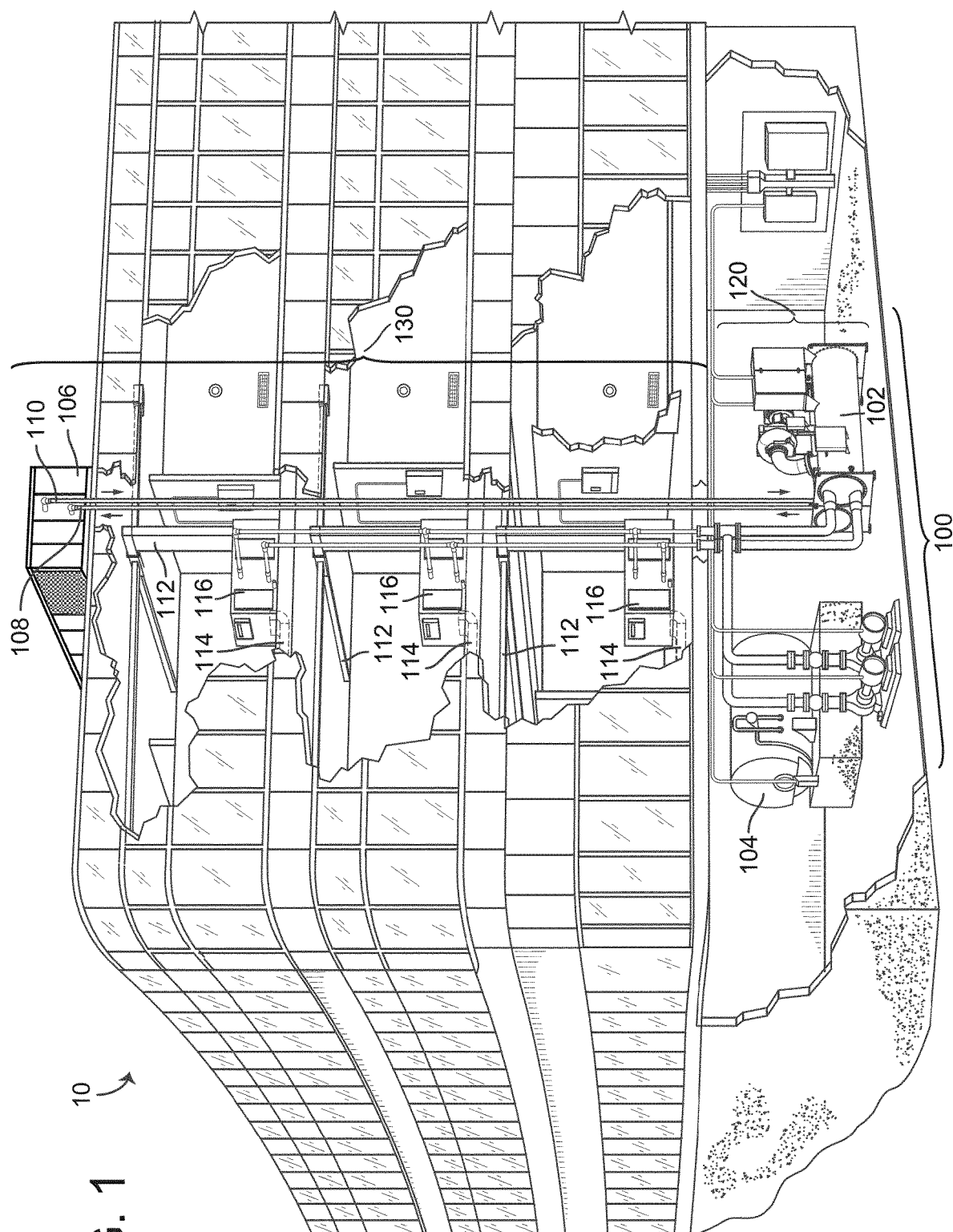
FIG. 1 is a drawing of a building equipped with a HVAC system, according to some embodiments.

Referring generally to the FIGURES, systems and methods for performing a clustering analysis of predictive models based on model parameters is shown, according to some embodiments. The predictive models can be used to predict how system dynamics of a system (e.g., a building, a zone of a building, etc.) change over time. The predictive models can utilize information such as weather data (e.g., external air temperature, relative humidity, air quality, wind speed, etc.) to determine how the system dynamics (e.g., thermal dynamics) may change. Predictive models can be used in various control-based applications such as model predictive control (MPC). In particular, MPC can utilize the predictive models to generate control signals in order to operate building equipment to affect a change on a variable state or condition of the system. If the predictive model accurately models the associated system, determinations regarding operation of the building equipment can maintain occupant comfort and optimize (e.g., reduce) overall costs.

A predictive model for a system can be identified via a system identification process. System identification is an algorithm that can be utilized to build the predictive model describing various aspects of a system (e.g., a room, a building, etc.). For example, the predictive model can describe dynamics such as variable refrigerant flow (VRF) heating and cooling, a dynamic response of a room to supplied heating or cooling, etc. The system identification process can utilize data describing the system as training data for properly identifying the predictive model. For example, the data may include historic data describing operation of heating, ventilation, or air conditioning (HVAC) equipment, previous indoor air temperatures, outdoor weather data, etc.

Utilizing the predictive model in control-based applications such as MPC may require a significant amount of processing resources. For example, performing an MPC calculation (i.e., calculating an energy cost savings function) can take in excess of thirty seconds on a standard computer for a single zone of a building. If MPC is performed for a building with multiple zones, an amount of time to perform MPC for the entire building may be large (e.g., a few minutes, an hour, etc.) depending on processing resources available. The amount of time required to perform MPC due to computational complexity may result in HVAC and/or other building equipment not receiving optimal control signals (e.g., optimal setpoints) for some period of time. In other words, excessive computational complexity can result in failure to fully optimize costs (e.g., energy costs) due to a time delay in performing MPC computations.

To mitigate effects of time delay, a clustering analysis can be performed on zones of the building. The clustering analysis can group together similar zones into zone groups based on the predictive models describing the zones. In particular, the clustering analysis can determine how to generate zone groupings based on model parameters of the predictive models. If model parameters of predictive models are similar, the predictive models may describe zones with similar dynamics. As such, a single zone group model can be generated that describes dynamics of each of the zones with similar dynamics. Advantageously, zone group models can reduce computational complexity of performing MPC as a single MPC calculation can be performed for each zone group model and applied to all zones within the associated zone group. It should be appreciated that while the FIGURES may describe predictive models for zones and zone groups of buildings, the clustering analysis for predictive models as described herein can be applied to other types of predictive models (e.g., predictive models for entire buildings and groups of buildings, predictive models for locations within a room of a building, etc.). These and other features of clustering analyses for predictive models are discussed in greater detail below.

Building HVAC Systems

Referring to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

HVAC System and Model

Figure 2:
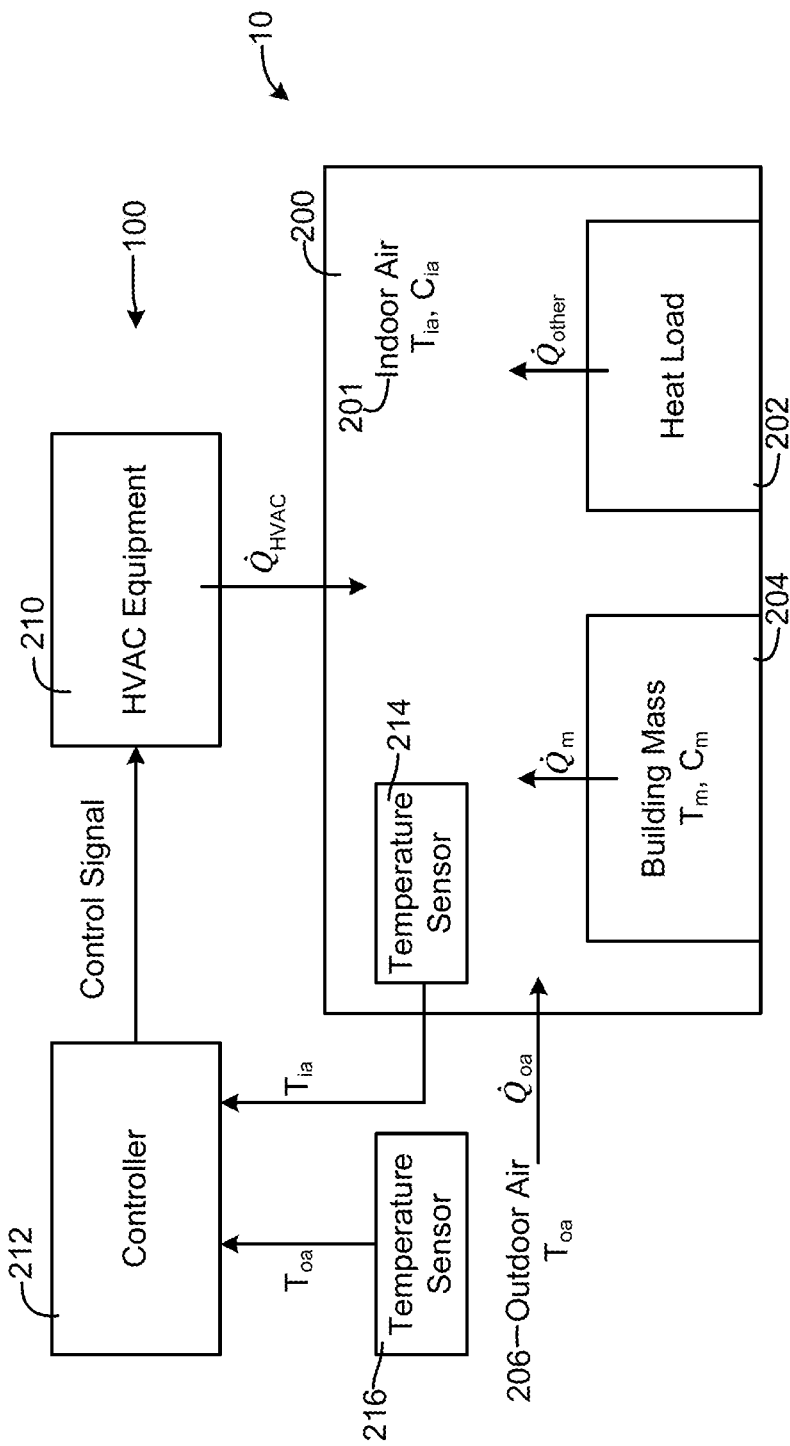
FIG. 2 is a block diagram of the building and HVAC system of FIG. 1, according to some embodiments.

Referring now to FIG. 2, a block diagram of the HVAC system 100 with building 10 is shown, according to an exemplary embodiment. More particularly, FIG. 2 illustrates the variety of heat transfers that affect the indoor air temperature $T_{ia}$ of the indoor air 201 in zone 200 of building 10. Zone 200 is a room, floor, area, etc. of building 10. In general, the primary goal of the HVAC system 100 is to maintain the indoor air temperature $T_{ia}$ in the zone 200 at or around a desired temperature to facilitate the comfort of occupants of the zone 200 or to meet other needs of the zone 200.

As shown in FIG. 2, the indoor air temperature $T_{ia}$ of the zone 200 has a thermal capacitance $C_{ia}$. The indoor air temperature $T_{ia}$ is affected by a variety of heat transfers $\dot{Q}$ into the zone 200, as described in detail below. It should be understood that although all heat transfers $\dot{Q}$ are shown in FIG. 2 as directed into the zone 200, the value of one or more of the heat transfers $\dot{Q}$ may be negative, such that heat flows out of the zone 200.

The heat load 202 contributes other heat transfer $\dot{Q}_{other}$ to the zone 200. The heat load 202 includes the heat added to the zone by occupants (e.g., people, animals) that give off body heat in the zone 200. The heat load 202 also includes computers, lighting, and other electronic devices in the zone 200 that generate heat through electrical resistance, as well as solar irradiance.

The building mass 204 contributes building mass heat transfer $\dot{Q}_m$ to the zone 200. The building mass 204 includes the physical structures in the building, such as walls, floors, ceilings, furniture, etc., all of which can absorb or give off heat. The building mass 204 has a temperature $T_m$ and a lumped mass thermal capacitance $C_m$. The resistance of the building mass 204 to exchange heat with the indoor air 201 (e.g., due to insulation, thickness/layers of materials, etc.) may be characterized as mass thermal resistance $R_{mi}$.

The outdoor air 206 contributes outside air heat transfer $\dot{Q}_{oa}$ to the zone 200. The outdoor air 206 is the air outside of the building 10 with outdoor air temperature $T_{oa}$. The outdoor air temperature $T_{oa}$ fluctuates with the weather and climate. Barriers between the outdoor air 206 and the indoor air 201 (e.g., walls, closed windows, insulation) create an outdoor-indoor thermal resistance $R_{oi}$ to heat exchange between the outdoor air 206 and the indoor air 201.

The HVAC system 100 also contributes heat to the zone 200, denoted as $\dot{Q}_{HVAC}$. The HVAC system 100 includes HVAC equipment 210, controller 212, an indoor air temperature sensor 214 and an outdoor air temperature sensor 216. The HVAC equipment 210 may include the waterside system 120 and airside system 130 of FIG. 1, or other suitable equipment for controllably supplying heating and/or cooling to the zone 200. In general, HVAC equipment 210 is controlled by a controller 212 to provide heating (e.g., positive value of $\dot{Q}_{HVAC}$) or cooling (e.g., a negative value of $\dot{Q}_{HVAC}$) to the zone 200.

The indoor air temperature sensor 214 is located in the zone 200, measures the indoor air temperature $T_{ia}$, and provides the measurement of $T_{ia}$ to the controller 212. The outdoor air temperature sensor 216 is located outside of the building 10, measures the outdoor air temperature $T_{oa}$, and provides the measurement of $T_{oa}$ to the controller 212.

The controller 212 receives the temperature measurements $T_{oa}$ and $T_{ia}$, generates a control signal for the HVAC equipment 210, and transmits the control signal to the HVAC equipment 210. The operation of the controller 212 is discussed in detail below. In general, the controller 212 considers the effects of the heat load 202, building mass 204, and outdoor air 206 on the indoor air 201 in controlling the HVAC equipment 210 to provide a suitable level of $\dot{Q}_{HVAC}$. A model of this system for use by the controller 212 is described with reference to FIG. 3.

In the embodiments described herein, the control signal provide to the HVAC equipment 210 by the controller 110 indicates a temperature setpoint $T_{sp}$ for the zone 200. To determine the temperature setpoint $T_{sp}$, the controller 212 assumes that the relationship between the indoor air temperature $T_{ia}$ and the temperature setpoint $T_{sp}$ follows a proportional-integral control law with saturation, represented as:

$$\dot{Q}_{HVAC,j} = K_{p,j}\varepsilon_{sp} + K_{i,j}\int_0^t \varepsilon_{sp}(s)ds \quad \text{(Eq. A)}$$

$$\varepsilon_{sp} = T_{sp,j} - T_{ia} \quad \text{(Eq. B)}$$

where $j \in \{clg, hlg\}$ is the index that is used to denote either heating or cooling mode. Different parameters $K_{p,j}$ and $k_{i,j}$ are needed for the heating and cooling mode. Moreover, the heating and cooling load is constrained to the following set: $\dot{Q}_{HVAC,j} \in [0, \dot{Q}_{clg,max}]$ for cooling mode (j=clg) and $\dot{Q}_{HVAC,j} \in [-\dot{Q}_{htg,max}, 0]$ for heating mode (j=htg). As discussed in detail below with reference to FIG. 4, the controller 212 uses this model in generating a control signal for the HVAC equipment 210.

Figure 3:
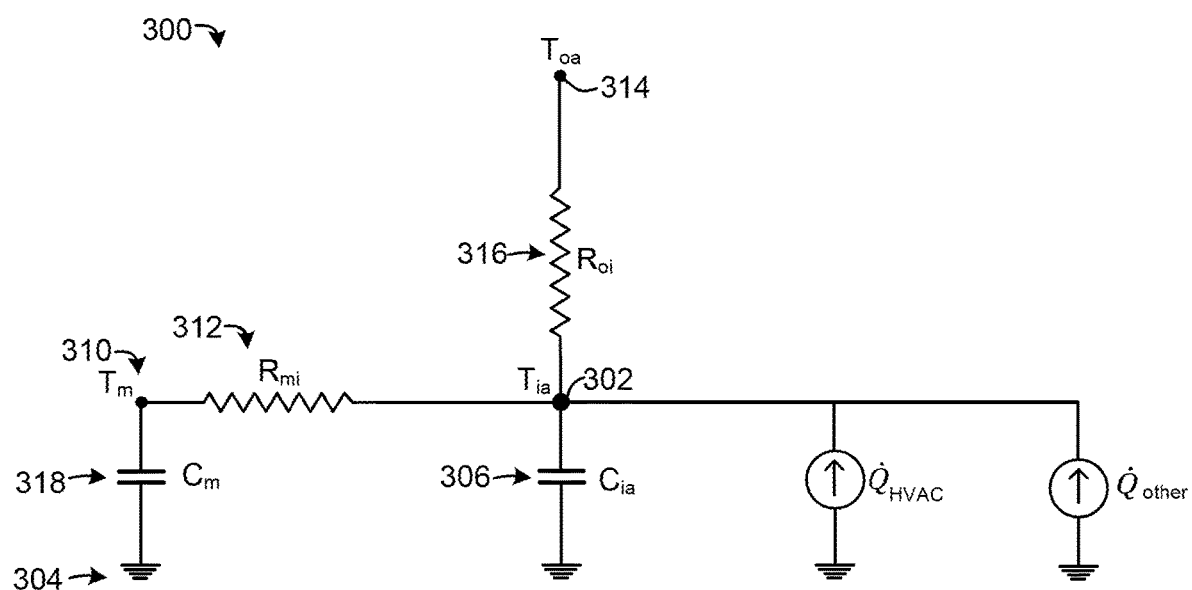
FIG. 3 is a circuit-style diagram of a model of the building and HVAC system of FIG. 1, according to some embodiments.

Referring now to FIG. 3, a circuit-style diagram 300 corresponding to the zone 200 and the various heat transfers $\dot{Q}$ of FIG. 2 is shown, according to an exemplary embodiment. In general, the diagram 300 models the zone 200 as a two thermal resistance, two thermal capacitance, control-oriented thermal mass system. This model can be characterized by the following system of linear differential equations, described with reference to FIG. 3 below:

$$C_{ia}\dot{T}_{ia} = \frac{1}{R_{mi}}(T_m - T_{ia}) + \frac{1}{R_{oi}}(T_{oa} - T_{ia}) - \dot{Q}_{HVAC} + \dot{Q}_{other} \quad \text{(Eq. C)}$$

$$C_m\dot{T}_m = \frac{1}{R_{mi}}(T_{ia} - T_m) \quad \text{(Eq. D)}$$

where the first line (Eq. C) focuses on the indoor air temperature $T_{ia}$, and each term in Eq. C corresponds to a branch of diagram 300 as explained below:

Indoor air node 302 corresponds to the indoor air temperature $T_{ia}$. From indoor air node 302, the model branches in several directions, including down to a ground 304 via a capacitor 306 with a capacitance $C_{ia}$. The capacitor 306 models the ability of the indoor air to absorb or release heat and is associated with the rate of change of the indoor heat transfer $\dot{T}_{ia}$. Accordingly, the capacitor 306 enters Eq. C on the left side of the equation as $C_{ia}\dot{T}_{ia}$.

From indoor air node 302, the diagram 300 also branches left to building mass node 310, which corresponds to the thermal mass temperature $T_m$. A resistor 312 with mass thermal resistance $R_{mi}$ separates the indoor air node 302 and the building mass node 310, modeling the heat transfer $\dot{Q}_m$ from the building mass 204 to the indoor air 201 as $$\frac{1}{R_{mi}}(T_m - T_{ia}).$$

This term is included on the right side of Eq. C above as contributing to the rate of change of the indoor air temperature $\dot{T}_{ia}$.

The diagram 300 also branches up from indoor air node 302 to outdoor air node 314. A resistor 316 with outdoor-indoor thermal resistance $R_{oi}$ separates the indoor air node 302 and the outdoor air node 314, modeling the flow heat from the outdoor air 206 to the indoor air 201 as $$\frac{1}{R_{oi}}(T_{oa} - T_{ia}).$$

This term is also included on the right side of Eq. C above as contributing to the rate of change of the indoor air temperature $\dot{T}_{ia}$.

Also from indoor air node 302, the diagram 300 branches right to two $\dot{Q}$ sources, namely $\dot{Q}_{HVAC}$ and $\dot{Q}_{other}$. As mentioned above, $\dot{Q}_{other}$ corresponds to heat load 202 and to a variety of sources of energy that contribute to the changes in the indoor air temperature $T_{ia}$. $\dot{Q}_{other}$ is not measured or controlled by the HVAC system 100, yet contributes to the rate of change of the indoor air temperature $T_{ia}$. $\dot{Q}_{HVAC}$ is generated and controlled by the HVAC system 100 to manage the indoor air temperature $T_{ia}$. Accordingly, $\dot{Q}_{HVAC}$ and $\dot{Q}_{other}$ are included on the right side of Eq. C above.

The second nonlinear differential equation (Eq. D) above focuses on the rate of change $\dot{T}_m$ in the building mass temperature T. The capacity of the building mass to receive or give off heat is modelled by capacitor 318. Capacitor 318 has lumped mass thermal capacitance $C_m$ and is positioned between a ground 304 and the building mass node 310 and regulates the rate of change in the building mass temperature $T_m$. Accordingly, the capacitance $C_m$ is included on left side of Eq. D. Also branching from the building mass node 310 is resistor 312 leading to indoor air node 302. As mentioned above, this branch accounts for heat transfer $\dot{Q}_m$ between the building mass 204 and the indoor air 201. Accordingly, the term $$\frac{1}{R_{mi}}(T_{ia} - T_m)$$

is included on me right side of Eq. D.

As described in detail below, the model represented by diagram 300 is used by the controller 212 in generating a control signal for the HVAC equipment 210. More particularly, the controller 212 uses a state-space representation of the model shown in diagram 300. The state-space representation used by the controller 212 can be derived by incorporating Eq. A and B with Eq. C and D, and writing the resulting system of equations as a linear system of differential equations to get:

$$\begin{bmatrix} \dot{T}_{ia} \\ \dot{T}_m \\ \dot{I} \end{bmatrix} = \begin{bmatrix} \frac{1}{C_{ia}}\left(K_{p,j} - \frac{1}{R_{mi}} - \frac{1}{R_{oi}}\right) & \frac{1}{C_{ia}R_{mi}} & \frac{K_{I,j}}{C_{ia}} \\ \frac{1}{C_m R_{mi}} & -\frac{1}{C_m R_{mi}} & 0 \\ -1 & 0 & 0 \end{bmatrix} \quad \text{(Eq. E)}$$

$$\begin{bmatrix} T_{ia} \\ T_m \\ I \end{bmatrix} + \begin{bmatrix} -\frac{K_{p,j}}{C_{ia}} & \frac{1}{C_{ia}R_{oi}} \\ 0 & 0 \\ 1 & 0 \end{bmatrix} \begin{bmatrix} T_{spj} \\ T_{oa} \end{bmatrix} + \begin{bmatrix} \frac{1}{C_{ia}} \\ 0 \\ 0 \end{bmatrix} \dot{Q}_{other};$$

$$\begin{bmatrix} T_{ia} \\ \dot{Q}_{HVAC,j} \end{bmatrix} = \begin{bmatrix} 1 & 0 & 0 \\ -K_{p,j} & 0 & K_{I,j} \end{bmatrix} \begin{bmatrix} T_{ia} \\ T_m \\ I \end{bmatrix} + \begin{bmatrix} 0 & 0 \\ K_{p,j} & 0 \end{bmatrix} \begin{bmatrix} T_{sp,j} \\ T_{oa} \end{bmatrix}; \quad \text{(Eq. F)}$$

where I represents the integral term $\int_0^t \varepsilon_{sp}(s)\,ds$ from Eq. A. The resulting linear system has three states ($T_{ia}$, $T_m$, I), two inputs ($T_{sp,j}$, $T_{oa}$), two outputs ($T_{ia}$, $\dot{Q}_{HVAC}$), and one disturbance $\dot{Q}_{other}$. Because $\dot{Q}_{other}$ is not measured or controlled, the controller 212 models the disturbance $\dot{Q}_{other}$ using an input disturbance model that adds a forth state d to the state space representation. In a more compact form, this linear system of differential equations can be written as:

$$\dot{x}(t) = A_c(\theta)x(t) + B_c(\theta)u(t); \quad \text{(Eq. G)}$$

$$y(t) = C_c(\theta)x(t) + D_c(\theta)u(t); \quad \text{(Eq. H)}$$

where $$A_c(\theta) = \begin{bmatrix} -(\theta_1 + \theta_2 + \theta_3\theta_4) & \theta_2 & \theta_3\theta_4\theta_5 \\ \theta_6 & -\theta_6 & 0 \\ -1 & 0 & 0 \end{bmatrix}, B_c(\theta) = \begin{bmatrix} \theta_3\theta_4 & \theta_1 \\ 0 & 0 \\ 1 & 0 \end{bmatrix},$$

$$C_c(\theta) = \begin{bmatrix} 1 & 0 & 0 \\ -\theta_4 & 0 & \theta_5\theta_4 \end{bmatrix}, D_c(\theta) = \begin{bmatrix} 0 & 0 \\ \theta_4 & 0 \end{bmatrix};$$

$$\theta_1 = \frac{1}{C_{ia}R_{oi}}; \theta_2 = \frac{1}{C_{ia}R_{mi}}; \theta_3 = \frac{1}{C_{ia}};$$

$$\theta_4 = K_p; \theta_5 = \frac{1}{\tau}; \theta_6 = \frac{1}{C_m R_{mi}}; \text{ and}$$

$$\dot{x}(t) = \begin{bmatrix} \dot{T}_{ia} \\ \dot{T}_m \\ \dot{I} \end{bmatrix}; x(t) = \begin{bmatrix} T_{ia} \\ T_m \\ I \end{bmatrix}; u(t) = \begin{bmatrix} T_{spj} \\ T_{oa} \end{bmatrix}.$$

As described in detail below, the controller 212 uses a two-step process to parameterize the system. In the first step, the controller 212 identifies the system parameters $\theta = \{\theta_1, \theta_2, \theta_3, \theta_4, \theta_5, \theta_6\}$ (i.e., the values of $C_{ia}$, $C_m$, $R_{mi}$, $R_{oi}$, $K_{p,j}$, $K_{i,j}$). The disturbance state d is then introduced into the model and an Kalman estimator gain is added, such that in the second step the controller 212 identifies the Kalman gain parameters K.

As used herein, the term 'variable' refers to an item/quantity capable of varying in value over time or with respect to change in some other variable. A "value" as used herein is an instance of that variable at a particular time. A value may be measured or predicted. For example, the temperature setpoint $T_{sp}$ is a variable that changes over time, while $T_{sp}(3)$ is a value that denotes the setpoint at time step 3 (e.g., 68 degrees Fahrenheit). The term "predicted value" as used herein describes a quantity for a particular time step that may vary as a function of one or more parameters.

Controller for HVAC Equipment with System Identification

Figure 4:
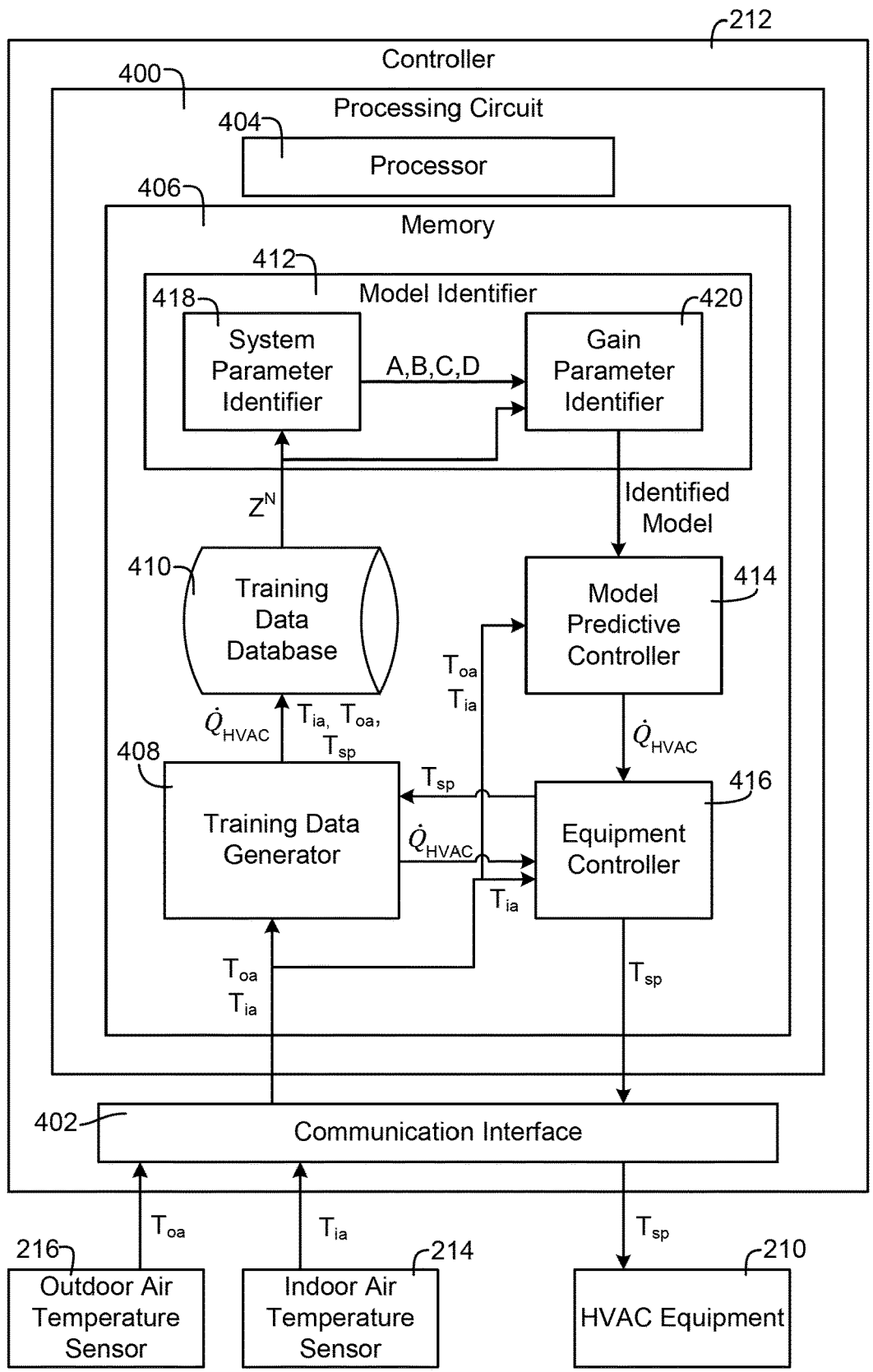
FIG. 4 is a block diagram of a controller for use with the HVAC system of FIG. 1, according to some embodiments.

Referring now to FIG. 4, a detailed diagram of the controller 212 is shown, according to an exemplary embodiment. The controller 212 includes a processing circuit 400 and a communication interface 402. The communication interface 402 is structured to facilitate the exchange of communications (e.g., data, control signals) between the processing circuit 400 and other components of HVAC system 100. As shown in FIG. 4, the communication interface 402 facilitates communication between the processing circuit 400 and the outdoor air temperature sensor 216 and the indoor air temperature sensor 214 to all temperature measurements $T_{oa}$ and $T_{ia}$ to be received by the processing circuit 400. The communication interface 402 also facilitates communication between the processing circuit 400 and the HVAC equipment 210 that allows a control signal (indicated as temperature setpoint $T_{sp}$) to be transmitted from the processing circuit 400 to the HVAC equipment 210.

The processing circuit 400 is structured to carry out the functions of the controller described herein. The processing circuit 400 includes a processor 404 and a memory 406. The processor 404 may be implemented as a general-purpose processor, an application-specific integrated circuit, one or more field programmable gate arrays, a digital signal processor, a group of processing components, or other suitable electronic processing components. The memory 406, described in detail below, includes one or more memory devices (e.g., RAM, ROM, NVRAM, Flash Memory, hard disk storage) that store data and/or computer code for facilitating at least some of the processes described herein. For example, the memory 406 stores programming logic that, when executed by the processor 404, controls the operation of the controller 212. More particularly, the memory 406 includes a training data generator 408, a training data database 410, a model identifier 412, a model predictive controller 414, and an equipment controller 416. The various generators, databases, identifiers, controllers, etc. of memory 406 may be implemented as any combination of hardware components and machine-readable media included with memory 406.

The equipment controller 416 is configured to generate a temperature setpoint $T_{sp}$ that serves as a control signal for the HVAC equipment 210. The equipment controller receives inputs of the indoor air temperature $T_{ia}$ from the indoor air temperature sensor 214 via the communication interface 402 and $\dot{Q}_{HVAC}$ from the model predictive controller 414 (during normal operation) and the training data generator 408 (during a training data generation phase described in detail below). The equipment controller uses $T_{ia}$ and $\dot{Q}_{HVAC}$ to generate $T_{sp}$ by solving Eq. A and Eq. B above for $T_{sp}$. The equipment controller 416 then provides the control signal $T_{sp}$ to the HVAC equipment 210 via the communication interface 402.

The model predictive controller 414 determines $\dot{Q}_{HVAC}$ based on an identified model and the temperature measurements $T_{ia}$, $T_{oa}$, and provides $\dot{Q}_{HVAC}$ to the equipment controller 416. The model predictive controller 414 follows a model predictive control (MPC) approach. The MPC approach involves predicting future system states based on a model of the system, and using those predictions to determine the controllable input to the system (here, $\dot{Q}_{HVAC}$) that bests achieves a control goal (e.g., to maintain the indoor air temperature near a desired temperature). A more accurate model allows the MPC to provide better control based on more accurate predictions. Because the physical phenomena that define the behavior of the system (i.e., of the indoor air 201 in the building 10) are complex, nonlinear, and/or poorly understood, a perfect model derived from first-principles is generally unachievable or unworkable. Thus, the model predictive controller 414 uses a model identified through a system identification process facilitated by the training data generator 408, the training data database 410, and the model identifier 412, described in detail below.

System identification, as facilitated by the training data generator 408, the training data database 410, and the model identifier 412, is a process of constructing mathematical models of dynamic systems. System identification provides a suitable alternative to first-principles-derived model when first principles models are unavailable or too complex for on-line MPC computations. System identification captures the important and relevant system dynamics based on actual input/output data (training data) of the system, in particular by determining model parameters particular to a building or zone to tune the model to the behavior of the building/zone. As described in detail below, the training data generator 408, the training data database 410, and the model identifier 412 each contribute to system identification by the controller 212.

The training data generator 408 is configured to generate training data by providing an excitation signal to the system. That is, the training data generator provides various $\dot{Q}_{HVAC}$ values to the equipment controller 416 for a number N of time steps k, and receives the measured output response of the indoor air temperature La at each time step k from the air temperature sensor 214. The various $\dot{Q}_{HVAC}$ values may be chosen by the training data generator 408 to explore the system dynamics as much as possible (e.g., across a full range of possible $\dot{Q}_{HVAC}$ values, different patterns of $\dot{Q}_{HVAC}$ values, etc.).

The equipment controller 416 receives the various $\dot{Q}_{HVAC}$ values and generates various control inputs $T_{sp}$ in response. The temperature setpoint $T_{sp}$ for each time step k is provided to the HVAC equipment 210, which operates accordingly to heat or cool the zone 200 (i.e., to influence $T_{ia}$). The temperature setpoints $T_{sp}$ may also be provided to the training data generator 408 to be included in the training data. The training data generator receives an updated measurement of the indoor air temperature $T_{ia}$ for each time step k and may also receive the outdoor air temperature $T_{oa}$ for each time step k. The training data generator 408 thereby causes the states, inputs, and outputs of the system to vary across the time steps k and generates data corresponding to the inputs and outputs.

The inputs and outputs generated by the training data generator 408 are provided to the training data database 410. More particularly, in the nomenclature of the model of Eq. E and Eq. F above, the training data generator 408 provides inputs $T_{sp}$ and $T_{oa}$ and outputs $\dot{Q}_{HVAC}$ and $T_{ia}$ for each time step k to the training data database 410.

The training data database 410 stores the inputs and outputs for each time step k provided by the training data generator 408. Each input and output is tagged with a time step identifier, so that data for the same time step can be associated together. The training data database 410 thereby collects and stores input and output data for each time step k, k=0, . . . , N, or, more specifically, $T_{sp}(k)$, $T_{oa}(k)$, $T_{ia}(k)$, and $\dot{Q}_{HVAC}(k)$, for k, k=0, . . . , N. This data is grouped together in the training data database 410 in a set of training data $Z^N$. In the notation of Eq. G and Eq. H, $Z^N=[y(1), u(1), y(2), u(2), \ldots y(N), u(N)]$.

In some embodiments, the training data is refined using a saturation detection and removal process. System and methods for saturation detection and removal suitable for use to refine the training data $Z^N$ are described in U.S. patent application Ser. No. 15/900,459, filed Feb. 20, 2018, incorporated by reference herein in its entirety. For example, as described in detail therein, the training data may be filtered by determining whether the operating capacity is in a non-transient region for a threshold amount of a time period upon determining that an error for the building zone exists for the time period, and in response to a determination that the operating capacity is in the non-transient region for at least the threshold amount of the time period, indicating the time period as a saturation period. Data from the saturation period can then be removed from the training data.

The model identifier 412 accesses the training data database 410 to retrieve the training data $Z^N$ and uses the training data $Z^N$ to identify a model of the system. The model identifier 412 includes a system parameter identifier 418 and a gain parameter identifier 420. As shown in detail in FIG. 5 and discussed in detail with reference thereto, the system parameter identifier 418 carries out a first step of system identification, namely identifying the model parameters, while the gain parameter identifier 420 carries out the second step, namely determining a Kalman gain estimator. The model parameters and the Kalman gain estimator are included in an identified model of the system, and that model is provided to the model predictive controller 414. The model predictive controller can thus facilitate the control of the HVAC equipment 210 as described above.

Figure 5:
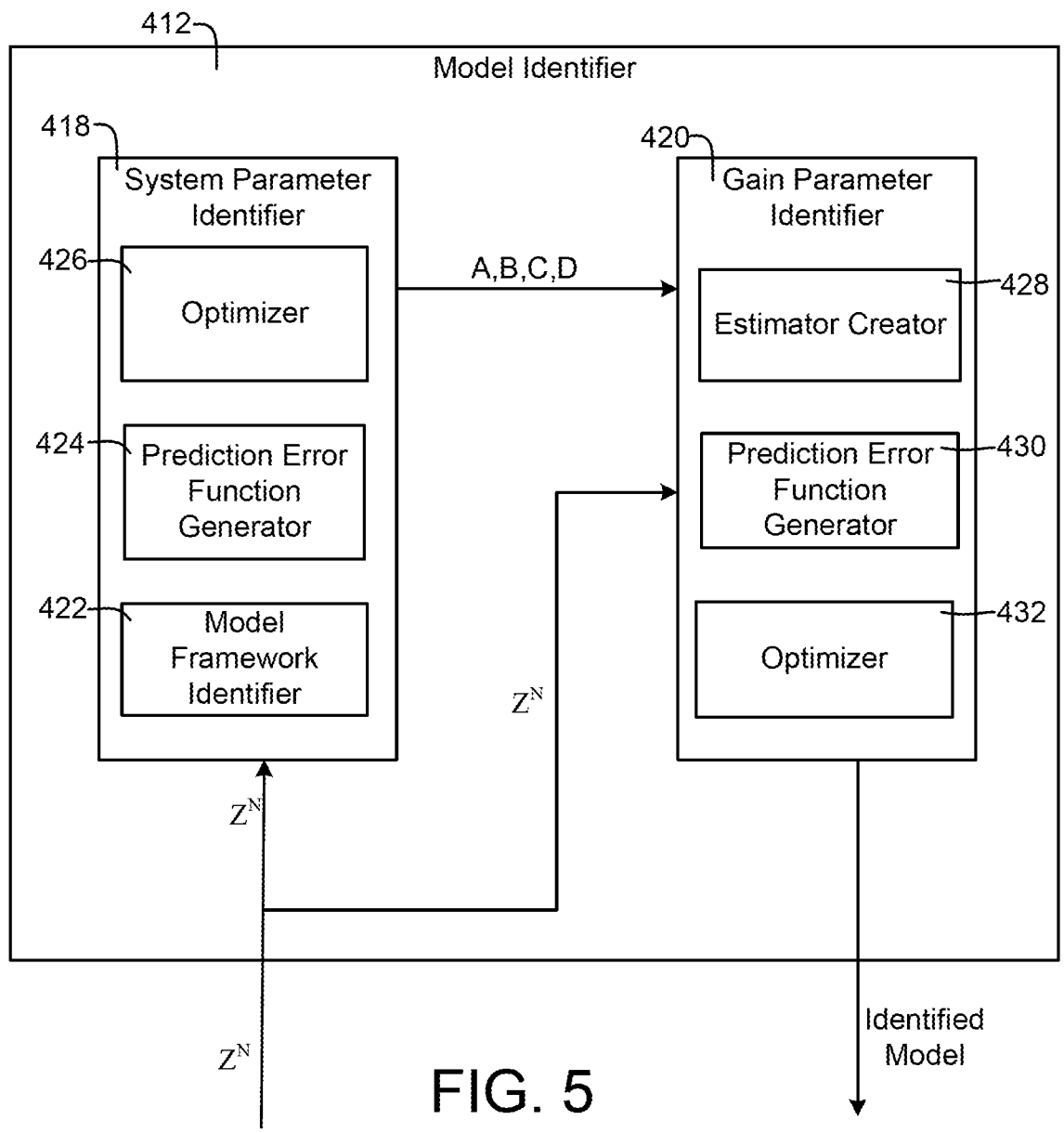
FIG. 5 is a detailed block diagram of a model identifier of the controller of FIG. 4, according to some embodiments.

Referring now to FIG. 5, a detailed view of the model identifier 412 is shown, according to an exemplary embodiment. As mentioned above, the model identifier 412 includes the system parameter identifier 418 and the gain parameter identifier 420. The system parameter identifier 418 is structured to identify the matrices A, B, C, D of Eqs. G and H, i.e., the values of $\theta=\{\theta_1, \theta_2, \theta_3, \theta_4, \theta_5, \theta_6\}$. In the embodiment described herein, this corresponds to finding the values of $C_{ia}$, $C_m$, $R_{mi}$, $R_{oi}$, $K_{p,j}$, and $K_{i,j}$.

The system parameter identifier 418 includes a model framework identifier 422, a prediction error function generator 424, and an optimizer 426. The model framework identifier 422 identifies that the model of the system, denoted as $\mathcal{M}(\theta)$, corresponds to the form described above in Eqs. G and H, i.e., $$\dot{x}(t)=A_c(\theta)x(t)+B_c(\theta)u(t); \quad \text{(Eq. G)}$$

$$y(t)=C_c(\theta)x(t)+D_c(\theta)u(t); \quad \text{(Eq. H)}$$

The model framework identifier 422 thereby determines that the system parameter identifier 418 has the goal of determining a parameter vector $\hat{\theta}_N$ from the set of $\theta \in D_{\mathcal{M}} \subset \mathbb{R}^d$, where $D_{\mathcal{M}}$ is the set of admissible model parameter values. The resulting possible models are given by the set: $M=\{\mathcal{M}(\theta), \theta \in D_{\mathcal{M}}\}$. The goal of the system parameter identifier 418 is to select a parameter vector $\hat{\theta}_N$ from among possible values of $\theta$ that best matches the model to the physical system (i.e., the vector $\theta$ is a list of variables and the vector $\hat{\theta}_N$ is a list of values), thereby defining matrices A, B, C, and D. The model framework identifier 422 also receives training data $Z^N$ and sorts the training data (i.e., $T_{sp}(k)$, $T_{oa}(k)$, $T_{ia}(k)$, and $\dot{Q}_{HVAC}(k)$, for k, k=0, ..., N) into the notation of Eq. G-H as input/output data $Z^N=[y(1), u(1), y(2), u(2), ..., y(N), u(N)]$.

The prediction error function generator 424 receives the model framework $M=\{\mathcal{M}(\theta), \theta \in D_{\mathcal{M}}\}$ and the training data $Z^N$ from the model framework identifier 422. The prediction error function generator 424 applies a prediction error method to determine the optimal parameter vector $\hat{\theta}_N$. In general, prediction error methods determine the optimal parameter vector $\hat{\theta}_N$ by minimizing some prediction performance function $V_N(\theta, Z^N)$ that is based in some way on the difference between predicted outputs and the observed/measured outputs included in the training data $Z^N$. That is, the parameter estimation $\hat{\theta}_N$ is determined as:

$$\hat{\theta}_N=\hat{\theta}_N(Z^N)=\arg\min_{\theta \in D_{\mathcal{M}}} V_N(\theta,Z^N).$$

The prediction error function generator 424 use one or more of several possible prediction error approaches to generate a prediction performance function $V_N(\theta, Z^N)$. In the embodiment shown, the prediction error function generator applies a simulation approach. In the simulation approach, the prediction error function generator 424 uses the model $\mathcal{M}(\theta)$, the input trajectory $[u(1), u(2), ..., u(N)]$, and an initial state $x(0)$ to produce predicted outputs in terms of $\theta$. That is, the prediction error function generator 424 predicts:

$$[\hat{y}(1|0,\theta),\hat{y}(2|0,\theta) ... \hat{y}(k|0,\theta) ... \hat{y}(N|0,\theta)],$$

where $\hat{y}(k|0, \theta)$ denotes the predicted output at time step k given the training data from time 0 and the model $\mathcal{M}(\theta)$. The prediction error function generator 424 then calculates a prediction error at each time step k is given by $\varepsilon(k, \theta):=y(k)-\hat{y}(k|0, \theta)$. The prediction error function generator 424 then squares the two-norm of each prediction error $\varepsilon(k, \theta)$ and sums the results to determine the prediction performance function, which can be written as:

$$V_N(\theta,Z^N)=\Sigma_{k=1}^N \|y(k)-\hat{y}(k|0,\theta)\|_2^2 \quad \text{(Eq. I)}.$$

In an alternative embodiment, the prediction error function generator 424 applies a one-step-ahead prediction error method to generate the prediction performance function $V_N(\theta, Z^N)$. In the one-step-ahead prediction error method, the prediction error function generator 424 uses past input-output data and the model $\mathcal{M}(\theta)$ the model to predict the output one step ahead in terms of $\theta$. That is, in the one-step ahead prediction error method, the prediction error function generator 424 generates one-step ahead predictions $\hat{y}(k|k-1, \theta)$, which denotes the predicted output at time step k given the past input-output sequence $Z^{k-1}$ and using parameters $\theta$. The one-step ahead prediction $\hat{y}(k|k-1, \theta)$ is then compared to the measured output $y(k)$ by the prediction error function generator 424 to determine the prediction error at k, defined as $\varepsilon(k, \theta):=y(k)-\hat{y}(k|k-1, \theta)$. The prediction error function generator 424 then squares the two-norm of the prediction errors for each k and sums the results, generating a prediction performance function that can be expressed in a condensed form as:

$$V_N(\theta, Z^N) = \frac{1}{N}\sum_{k=1}^{N} \|y(k) - \hat{y}(k \mid k-1, \theta)\|_2^2. \quad \text{(Eq. J)}$$

In other alternative embodiments, the prediction error function generator 424 uses a multi-step ahead prediction error approach to generate the prediction performance function. The multi-step ahead prediction error approach is described in detail below with reference to the gain parameter identifier 420 and FIGS. 7-8.

The prediction error function generator 424 then provides the performance function $V_N(\theta, Z^N)$ (i.e., from Eq. I or Eq. J in various embodiments) to the optimizer 426.

The optimizer 426 receives the prediction error function generated by the prediction error function generator 424 and optimizes the prediction error function in $\theta$ to determine $\hat{\theta}_N$. More specifically, the optimizer 426 finds the minimum value of the prediction error function $V_N(\theta, Z^N)$ as $\theta$ is varied throughout the allowable values of $\theta \in D_{\mathcal{M}}$. That is, the optimizer 426 determines $\hat{\theta}_N$ based on:

$$\hat{\theta}_N=\hat{\theta}_N(Z^N)=\arg\min_{\theta \in D_{\mathcal{M}}} V_N(\theta,Z^N).$$

The optimizer 426 then uses $\hat{\theta}_N$ to calculate the matrices A, B, C, and D. The system parameter identifier 418 then provides the identified matrices A, B, C, D to the gain parameter identifier 420.

The gain parameter identifier 420 receives the model with the matrices A, B, C, D (i.e., the model parameters) from system parameter identifier 418, as well as the training data $Z^N$ from the training data database 410, and uses that information to identify the gain parameters. The gain parameter identifier 420 includes an estimator creator 428, a prediction error function generator 430, and an optimizer 432.

The estimator creator 428 adds a disturbance model and introduces a Kalman estimator gain to account for thermal dynamics of the system, for example for the influence of $\dot{Q}_{other}$ on the system. The estimator creator 428 generates an augmented model with disturbance state d, given by:

$$\begin{bmatrix} \dot{x}(t) \\ \dot{d}(t) \end{bmatrix} = \begin{bmatrix} A_c & B_d \\ 0 & 0 \end{bmatrix} \begin{bmatrix} x(t) \\ d(t) \end{bmatrix} + \begin{bmatrix} B_c \\ 0 \end{bmatrix} u(t);$$

$$y(t) = \begin{bmatrix} C_c & C_d \end{bmatrix} \begin{bmatrix} x(t) \\ d(t) \end{bmatrix} + D_c u(t)$$

where the parameters $A_c$, $B_c$, $C_c$, and $D_c$ are the matrices A, B, C, D received from the system parameter identifier 418 and the disturbance model is selected with $$B_d = \frac{1}{C_{ia}} \text{ and } C_d = 0.$$

The estimator creator 428 then converts the model to a discrete time model, for example using 5-minute sampling periods, resulting in the matrices $A_{dis}$, $B_{dis}$, $C_{dis}$, $D_{dis}$ and the disturbance model discrete time matrix $B_{d_{dis}}$. The estimator creator 428 then adds a parameterized estimator gain, resulting in the following model:

$$\begin{bmatrix} \hat{x}(t+1 \mid t) \\ \hat{d}(t+1 \mid t) \end{bmatrix} = \begin{bmatrix} A_{dis} & B_{d_{dis}} \\ 0 & I \end{bmatrix} \begin{bmatrix} \hat{x}(t \mid t-1) \\ \hat{d}(t \mid t-1) \end{bmatrix} + \begin{bmatrix} B_{dis} \\ 0 \end{bmatrix} u(t) + \underbrace{\begin{bmatrix} K_x(\phi) \\ K_d(\phi) \end{bmatrix}}_{=:K(\phi)} (y(t) - \hat{y}(t \mid t-1)); \quad \text{(Eq. K)}$$

$$\hat{y}(t \mid t-1) = [C_{dis} \ 0] \begin{bmatrix} \hat{x}(t \mid t-1) \\ \hat{d}(t \mid t-1) \end{bmatrix} + D_{dis} u(t). \quad \text{(Eq. L)}$$

The matrix $K(\phi)$ is the estimator gain parameterized with the parameter vector $\phi$ where:

$$K_x(\phi) = \begin{bmatrix} \phi_1 & \phi_2 \\ \phi_3 & \phi_4 \\ \phi_5 & \phi_6 \end{bmatrix};$$

$$K_d(\phi) = [\phi_7 \ \phi_8].$$

In this notation, $\hat{x}(t+1|t)$ is an estimate of the state at time t+1 obtained using the Kalman filter and made utilizing information at sampling time t. For example, with a sampling time of five minutes, $\hat{x}(t+1|t)$ is an estimate of the state five minutes after the collection of the data that the estimate is based on. The goal of the gain parameter identifier is to identify parameters $\hat{\phi}_N$ (i.e., a vector of for each of $\phi_1 \ldots \phi_8$) that make the model best match the physical system.

The estimator creator 428 then provides the discrete time model with estimator gain (i.e., Eqs. K-L) to the prediction error function generator 430. The prediction error function generator receives the model from the estimator creator 428 as well as the training data $Z^N$ from the training data database 410, and uses the model (with the estimator gain) and the training data $Z^N$ to generate a prediction performance function.

Figure 7:
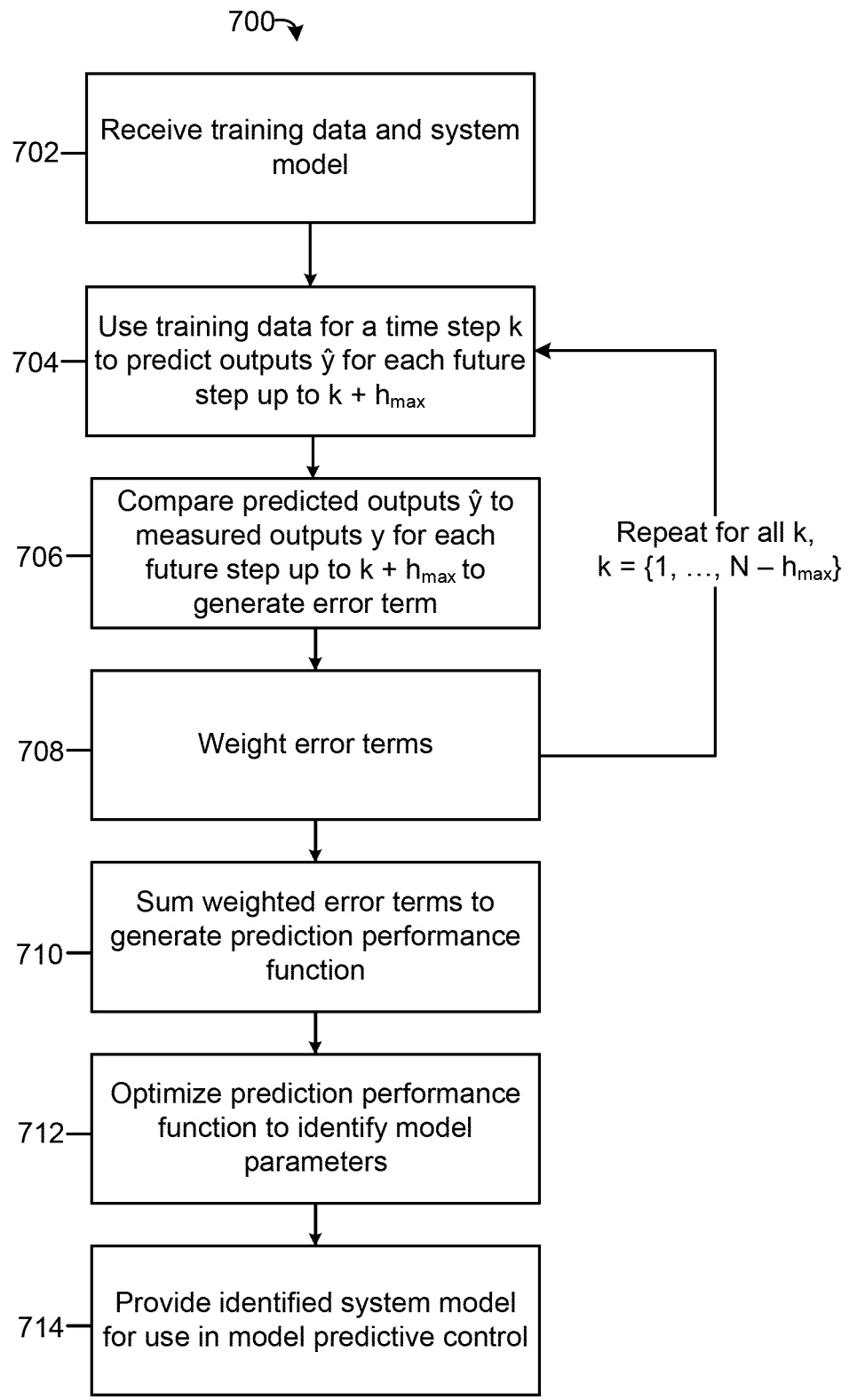
FIG. 7 is a flowchart of a multi-step ahead prediction error method for use in system identification, according to some embodiments.
Figure 8:
FIG. 8 is a visualization useful in illustrating the multi-step ahead prediction error method of FIG. 7, according to some embodiments.

The prediction error function generator 430 follows a multi-step ahead prediction error method to generate a predication performance function $V_N(\phi, Z^N)$. The multi-step ahead prediction error method is illustrated in FIGS. 7-8 and described in detail with reference thereto. As an overview, in the multi-step-ahead prediction error method, the prediction error function generator 430 uses past input-output data and the model $\mathcal{M}(\theta)$ the model to predict the output multiple step ahead in terms of $\phi$. That is, in the multi-step ahead prediction error method, the prediction error function generator 430 generates multi-step ahead predictions $\hat{y}(k+h|k-1, \phi)$, which denotes the predicted output at time step k+h given the past input-output sequence $Z^{k-1}$ and using parameters $\phi$. The index h corresponds the number of steps ahead the prediction is made, and for each time step k predictions are made for h=0, . . . , $h_{max}$ (i.e., when h=2, the prediction is three steps ahead because h is indexed from zero).

Each multiple multi-step ahead prediction $\hat{y}(k+h|k-1, \phi)$ is then compared to the corresponding measured output y(k) by the prediction error function generator 430 to determine the prediction error at k, defined as $\varepsilon(k, \theta):=y(k)-\hat{y}(k+h|k-1, \phi)$. The prediction error function generator 430 then squares the two-norm of the prediction errors for each k and sums the results, in some embodiments using an weighting function w(h). The prediction error function generator 430 thereby generates a prediction performance function that can be expressed in a condensed form as:

$$V_N(\phi, Z^N) = \sum_{k=1}^{N-h_{max}+1} \sum_{h=0}^{h_{max}} w(h) \|y(k+h) - \hat{y}(k+h \mid k-1, \phi)\|_2^2. \quad \text{(Eq. M)}$$

The multi-step ahead prediction error method is described in more detail below with reference to FIGS. 7-8. In alternative embodiments, the prediction error function generator 430 follows the simulation approach or the one-step ahead prediction error approach discussed above with reference to the prediction error function generator 424.

The prediction error function generator 430 then provides the prediction performance function (i.e., Eq. M) to the optimizer 432. The optimizer 432 receives the prediction error function $V_N(\phi, Z^N)$ generated by the prediction error function generator 430 and optimizes the prediction error function in $\phi$ to determine $\hat{\phi}_N$. More specifically, the optimizer 426 finds the minimum value of the prediction error function $V_N(\phi, Z^N)$ as $\phi$ is varied throughout the allowable values of $\phi$. In some cases, all real values of $\phi$ are allowable. That is, the optimizer 426 determines $\hat{\phi}_N$ based on:

$$\hat{\phi}_N = \hat{\phi}_N(Z^N) = \arg \min_\phi V_N(\phi, Z^N).$$

The optimizer 432 then uses $\hat{\phi}_N$ to calculate the matrices $K_x(\phi)$ and $K_d(\phi)$, resulting in a fully identified model. The gain parameter identifier 420 provides the identified model to the model predictive controller 414.

In some embodiments, the prediction error function generator 430 reconfigures the multi-step ahead prediction problem by defining augmented vectors that allow the multi-step ahead prediction performance function (Eq. M) to be recast in an identical structure to the single-step ahead prediction performance function (Eq. J). Existing software toolboxes and programs (e.g., Matlab system identification toolbox) configured to handle the single-step ahead prediction error approach can then be used to carry out the multi-step ahead prediction error approach. To reconfigure the problem for that purpose, the prediction error function generator 430 considers, the system model of the form:

$$x(k+1) = Ax(k) + Bu(k);$$

$$y(k) = Cx(k) + Du(k).$$

where the one-step prediction of $\hat{x}(k+1|k)$ using a steady-state Kalman gain is:

$$\hat{x}(k+1|k) = A\hat{x}(k|k-1) + Bu(k) + K(y(k) - C\hat{x}(k|k-1) - Du(k));$$

$$\hat{y}(k|k-1) = C\hat{x}(k|k-1) + Du(k).$$

In the multi-step prediction Kalman gain system identification problem, the complete pattern of the algebraic manipulations is shown by the 4-step prediction. The prediction error function generator 430 considers a case with four input data points and four output data-points starting from time h=0 to time h=3, so that $h_{max}=3$. The one-step prediction (with the prediction error function generator 430 given x0) is given by the equation:

$$\hat{x}(1|0)=Ax0+Bu(0)+K(y(0)-Cx0-Du(0));$$

$$\hat{y}(0|0)=Cx0+Du(0).$$

The prediction of the second step is $$\hat{x}(2|0)=A\hat{x}(1|0)+Bu(1)=A(Ax0+Bu(0)+K(y(0)-Cx0-Du(0)))+Bu(1);$$

$$\hat{y}(1|0)=C\hat{x}(1|0)+Du(1)=C(Ax0+Bu(0)+K(y(0)-Cx0-Du(0)))+Du(1).$$

The prediction of the third step is $$\hat{x}(3|0) = A\hat{x}(2|0) + Bu(2) =$$
$$A(A(Ax0 + Bu(0) + K(y(0) - Cx0 - Du(0))) + Bu(1)) + Bu(2);$$

$$\hat{y}(2|0) = C\hat{x}(2|0) + Du(2) =$$
$$C(A(Ax0 + Bu(0) + K(y(0) - Cx0 - Du(0))) + Bu(1)) + Du(2).$$

The forth step prediction is $$\hat{x}(4|0) = A\hat{x}(3|0) + Bu(3) =$$
$$A(A(A(Ax0 + Bu(0) + K(y(0) - Cx0 - Du(0))) + Bu(1)) + Bu(2)) + Bu(3);$$

$$\hat{y}(3|0) = C\hat{x}(3|0) + Du(3) =$$
$$C(A(A(Ax0 + Bu(0) + K(y(0) - Cx0 - Du(0))) + Bu(1)) + Bu(2)) + Du(3).$$

With these 4-step predictions, the pattern needed to cast the multi-step prediction problem as a 1-step prediction is revealed. By aggregating the matrices multiplying x0, y(0), u(0), u(1), u(2), and u(3), the pattern revealed is:

$$\hat{x}(1|0)=Ax0+Bu(0)+K(y(0)-Cx0-Du(0));$$

$$\hat{x}(2|0)=(A^2-AKC)x0+(AB-AKD)u(0)+Bu(1)+AKy(0);$$

$$\hat{x}(3|0)=(A^3-A^2KC)x0+(A^2B-A^2KD)u(0)+ABu(1)+Bu(2)+A^2Ky(0);$$

$$\hat{x}(4|0)=(A^4-A^3KC)x0+(A^3B-A^3KD)u(0)+A^2Bu(1)ABu(2)+Bu(3)+A^3Ky(0);$$

$$\hat{y}(0)=Cx0+Du(0);$$

$$\hat{y}(1|0)=(CA-CKC)x0+(CB-CKD)u(0)+Du(1)+CKy(0);$$

$$\hat{y}(2|0)=(CA^2-CAKC)x0+(CAB-CAKD)u(0)+CBu(1)+Du(2)+CAKy(0);$$

$$\hat{y}(3|0)=(CA^3-CA^2KC)x0+(CA^2B-CA^2KD)u(0)+CABu(1)+CBu(2)+Du(3)+CA^2Ky(0).$$

Based on that pattern, the prediction error function generator 430 defines the following vectors:

$$\tilde{u}(0) = \begin{bmatrix} u(0) \\ u(1) \\ u(2) \\ u(3) \\ y(0) \end{bmatrix}, \tilde{\hat{y}}(0) = \begin{bmatrix} \hat{y}(0) \\ \hat{y}(1|0) \\ \hat{y}(2|0) \\ \hat{y}(3|0) \end{bmatrix}, \tilde{y}(0) = \begin{bmatrix} y(0) \\ y(1) \\ y(2) \\ y(3) \end{bmatrix},$$

$\hat{x}(1|0)$ and x0 remain unchanged.

The new system that has the 4-step prediction casted into a one-step prediction which can be analyzed by the prediction error function generator 430 using an existing system identification software product as:

$$\hat{x}(1|0) = Ax0 + [B\ 0\ 0\ 0\ 0]\tilde{u}(0) + [K\ 0\ 0\ 0](\tilde{y}(0) - \tilde{\hat{y}}(0);$$

$$\tilde{\hat{y}}(0) = \begin{bmatrix} C \\ (CA - CKC) \\ (CA^2 - CAKC) \\ (CA^3 - CA^2KC) \end{bmatrix} x0 +$$

$$\begin{bmatrix} D & 0 & 0 & 0 & 0 \\ (CB - CKD) & D & 0 & 0 & CK \\ (CAB - CAKD) & CB & D & 0 & CAK \\ (CA^2B - CA^2KD) & CAB & CB & D & CA^2K \end{bmatrix} \tilde{u}(0).$$

In order to have the general formulation at time k for predicting $h_{max}$ step ahead in time, this four-step example can be extrapolated to define the general augmented input and output vectors as:

$$\tilde{\hat{y}}(k) = \begin{bmatrix} C \\ (CA - CKC) \\ (CA^2 - CAKC) \\ \vdots \\ (CA^{h_{max}} - CA^{h_{max}-1}KC) \end{bmatrix} \hat{x}(k|k-1) + \begin{bmatrix} D & 0 & 0 & 0 & 0 & 0 \\ (CB - CKD) & D & 0 & 0 & 0 & CK \\ (CAB - CAKD) & CB & D & 0 & 0 & CAK \\ (CA^2B - CA^2KD) & CAB & \ddots & \ddots & 0 & 0 & CA_2K \\ \vdots & \vdots & \ddots & CB & D & 0 & \vdots \\ (CA^{h_{max}-1}B - CA^{h_{max}-1}KD) & CA^{h_{max}-2}B & \cdots & CAB & CB & D & CA^{h_{max}-1}K \end{bmatrix} \tilde{u}(k);$$

$$\tilde{u}(k) = \begin{bmatrix} u(k) \\ u(k+1) \\ \vdots \\ u(k+h_{max}) \\ y(k) \end{bmatrix}, \tilde{\hat{y}}(k) = \begin{bmatrix} \hat{y}(k\mid k-1) \\ \hat{y}(k+1\mid k-1) \\ \vdots \\ \hat{y}(k+h_{max}\mid k-1) \end{bmatrix}, \tilde{y}(k) = \begin{bmatrix} y(k) \\ y(k+1) \\ \vdots \\ y(k+h_{max}) \end{bmatrix}$$

With these definition, the general formulation at time k for predicting $h_{max}$ steps ahead in time is:

$$\hat{x}(k+1\mid k) = A\hat{x}(k\mid k-1) + [B0 \ldots 0]\tilde{u}(k) + [K0 \ldots 0](\tilde{y}(k) - \tilde{\hat{y}}(k)).$$

As described above, in the multi-step ahead prediction error method the prediction error function generator 430 generates a function of the form:

$$V_N(\phi, Z^N) = \sum_{k=1}^{N-h_{max}+1} \sum_{h=0}^{h_{max}} w(h)\|y(k+h) - \hat{y}(k+h\mid k-1, \phi)\|_2^2. \quad \text{(Eq. M)}$$

If w(h)≡1 for all h, and using the augmented input and output vectors defined above, the multi-step ahead prediction performance function can be reconfigured into the following one-step ahead prediction performance function by the prediction error function generator 430:

$$V_N(\phi, Z^N) = V_N(\phi, Z^N) = \sum_{k=1}^{N-h_{max}+1} \left\|\tilde{y}(k) - \tilde{\hat{y}}(k, \theta)\right\|_2^2$$

The prediction error function generator 430 then uses this reconfigured format of the prediction performance function with existing software toolboxes suited for the one-step ahead prediction error approach. The prediction error function generator 430 may include machine-readable media storing computer code executable to apply such software.

System Identification Methods

Figure 6:
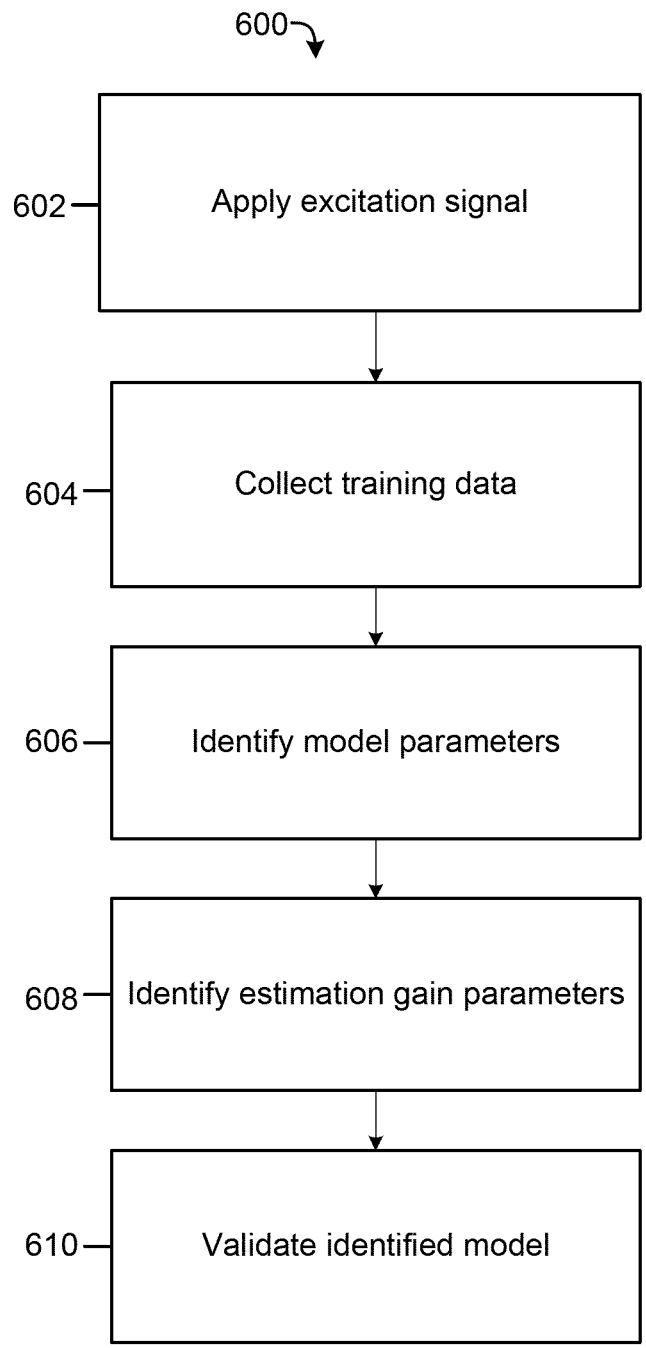
FIG. 6 is flowchart of a process for system identification, according to some embodiments.

Referring now to FIG. 6, a flowchart of a process 600 for system identification is shown, according to an exemplary embodiment. The process 600 can be carried out by the controller 212 of FIGS. 2 and 4.

At step 602, the controller 212 applies an excitation signal to the HVAC equipment 210. For example, the training data generator 408 may vary the $\dot{Q}_{HVAC}$ values supplied to the equipment controller 416, causing an excitation signal to be generated in the temperature setpoint $T_{sp}$ inputs provided to the HVAC equipment 210. In general, the excitation signal is designed to test the system in a way to provide robust data for use in system identification.

At step 604, training data is collected and stored by the controller 212. Training data includes measureable temperature readings, i.e., $T_{oa}$ and $T_{ia}$, controller-determined values $\dot{Q}_{HVAC}$ and $T_{sp}$ for each of a plurality of time steps k, k=0, ..., N. The training data therefore includes inputs u(k) and the outputs y(k) for the time period. The training data is received from temperature sensors 214, 216, training data generator 408, and/or equipment controller 416 and stored in training data database 410.

At step 606, the controller 212 identifies the model parameters for the system. That is, as discussed in detail above, the controller 212 determines the matrices A(θ), B(θ), C(θ), and D(θ) that minimize a prediction performance function $V_N(Z^N, \theta)$ for the model:

$$\dot{x}(t) = A_c(\theta)x(t) + B_c(\theta)u(t); \quad \text{(Eq. G)}$$

$$y(t) = C_c(\theta)x(t) + D_c(\theta)u(t); \quad \text{(Eq. H)}.$$

In identifying the model parameters, a simulation approach or a one-step-ahead prediction error approach is followed in some embodiments. These approaches are described in detail above with reference to the prediction error function generator 424 of FIG. 5. In other embodiments, the model parameters are determined at step 606 using a multi-step ahead prediction error method, described in detail with reference to FIGS. 7-8.

At step 608, the controller 212 identifies the gain estimator parameters. That is, the controller 212 determines the matrices $K_x$ and $K_d$ of Eq. K above. In preferred embodiments, the controller 212 uses the multi-step ahead prediction error method to find the matrices $K_x$ and $K_d$. The multi-step ahead prediction error method is described in detail below with reference to FIGS. 7-8. In alternative embodiments, a simulation approach or a one-step-ahead prediction error approach is followed to find the matrices $K_x$ and $K_d$.

At step 610, the identified model is validated by the controller 212. The controller 212 uses the identified model to generate control signal inputs $T_{sp}$ for the HVAC equipment 210 using model predictive control. The controller then monitors the temperature measurements $T_{oa}$ and $T_{ia}$ from temperature sensors 214, 216, the input $T_{sp}$, and the value $\dot{Q}_{HVAC}$ to determine how well the model matches system behavior in normal operation. For example, the training data database 410 may collect and store an addition set of training data that can be used by the model identifier 412 to validate the model. If some discrepancy is determined, the identified model may be updated. The identified model can thereby by dynamically adjusted to adjust for changes in the physical system.

Referring now to FIGS. 7-8 the multi-step ahead prediction error approach for use in system identification is illustrated, according to an exemplary embodiment. In FIG. 7, a flowchart of a process 700 for identifying system parameters using the multi-step ahead prediction error approach is shown, according to an exemplary embodiment. FIG. 8 shows an example visualization useful in explaining process 700. Process 700 can be carried out by the system parameter identifier 418 and/or the gain parameter identifier 420 of FIG. 5. In the embodiment described herein, the process 700 is implemented with the gain parameter identifier 420.

Process 700 begins at step 702, where the gain parameter identifier 420 receives training data $Z^N = [y(1), u(1), y(2), u(2), \ldots, y(N), u(N)]$ from the training data database 410. The training data includes measured outputs y(k) (i.e., $T_{ia}(k)$ and $\dot{Q}_{HVAC}(k)$) and inputs u(k) (i.e., $T_{oa}(k)$ and $T_{sp}(k)$) for each time step k, k=1, ..., N. N is the number of samples in the training data. The gain parameter identifier 420 also receives the system model from the system parameter identifier 418.

At step 704, the prediction error function generator 430 uses the training data for a time step k to predict outputs ŷ for each subsequent time step up to k+$h_{max}$. The value $h_{max}$ corresponds to the number of steps ahead the predictions are made, referred to herein as the prediction horizon. Because $h_{max}$ is indexed from zero in Eq. M above, the prediction horizon is one more than the value of $h_{max}$. For example, in the case shown in FIG. 8 and described below, predictions are made three steps ahead, corresponding to $h_{max}$=2 in the notation of Eq. D and a prediction horizon of three. The prediction horizon may be any integer greater than one, for example four or eight. The prediction horizon can be tuned experimentally, to determine an ideal prediction horizon. For example, too long of a prediction horizon may lead to poor prediction while too short of a prediction horizon may suffer the same limitations as the one-step ahead prediction error method mentioned above. In some cases, a prediction horizon of eight is preferred.

More specifically, at each step 704 the predicted outputs [ŷ(k|k−1), ŷ(k+1|k−1), . . . ŷ(k+$h_{max}$|k−1)] are predicted based on the past training data (i.e., through step k−1), denoted as $Z^{k-1}$, along with future inputs [u(k), u(k+1) . . . u(k+$h_{max}$)]. These predictions are made using the model $\mathcal{M}$ (ϕ), such that predicted outputs ŷ depend on ϕ.

To illustrate the predictions of step 704, FIG. 8 shows a simplified visualization in which y(k) and ŷ(k) are depicted as scalar values for the sake of simplified explanation. In FIG. 8, the graph 800 plots the values of y and ŷ over time t for five time steps past a starting time t=0. The solid circles 802 represent measured outputs y(t) from the training data. The unfilled boxes 804 represent predicted outputs ŷ(t|0), that is, the outputs predicted for each time step based on the input/output data available at time t=0 (e.g., y(0)). The dashed lines represent the propagation of the predictions; for example, graph 800 includes three unfilled boxes 804 connected by a dashed line to the solid circle 802 corresponding to y(0). This shows that the predictions ŷ(t|0), 1≤t≤3, represented by the unfilled boxes 804 were based on the measured value of y(0).

At step 706, the prediction error function generator 430 compares the predicted outputs ŷ to the measured outputs y for each future step up to k+$h_{max}$ (i.e., for all predicted outputs ŷ generated at step 704). More specifically, an error term for each step may be defined as y(k+h)−ŷ(k+h|k−1, ϕ). Because y and ŷ are vectors, the two-norm of this error term may be taken and squared to facilitate comparison between prediction errors as scalars, such that the error term becomes $\|y(k+h)-\hat{y}(k+h|k-1, \phi)\|_2^2$. This term appears in Eq. M above.

As shown in FIG. 8, step 706 can be understood as measuring the distance between, for example, each unfilled box 804 and the corresponding solid circle 802 (i.e., the unfilled box 804 and the solid circle 802 at the same time t). Thus, in the example of FIG. 8, step 706 includes calculating three error terms.

At step 708, the error terms are weighted based on a weighting function w(h). The weighting function w(h) allows the prediction errors to be given more or less weight depending on how many steps ahead the prediction is. The weighting function w(h) is preferably a monotonically decreasing function of h, so that farther-out-in-time predictions have less influence on the prediction error. In some embodiments, the weighting function w(h)=1. Step 708 thereby corresponds to the w(h) term in Eq. M above.

The process 700 then returns to step 704 to repeat steps 704-706 for each value of k, k=1, N−$h_{max}$. As illustrated in FIG. 8, repeating step 704 corresponds to generating the predictions represented by the unfilled circles 808 and the unfilled triangles 810. The unfilled circles 808 chart the predictions based on the output data available at time t=1, i.e., ŷ(t|1), for t=2, 3, 4. The unfilled triangles chart the predictions based on the output data available at time t=2, i.e., ŷ(t|2), for t=3, 4, 5. Process 700 therefore involves making multiple predictions for most time steps: for example, FIG. 8 shows three separate predictions for time t=3.

At step 706, the prediction error function generator 430 again compares the predicted outputs ŷ for the new value of k to the measured outputs y for each future time step up to k+$h_{max}$ to define the error term $\|y(k+h)-\hat{y}(k+h|k-1, \theta)\|_2^2$ as included in Eq. M. At step 708, the terms are again weighted by the weighting function w(h). The weighting function w(h) may be the same for each k.

In the notation of Eq. M, each iteration of steps 704-708 thus corresponds to steps necessary to generate the values used by the inner (right) summation indexed in h, while repetition of the steps 704-708 corresponds to the iteration through k represented in the outer (left) summation. At step 710, then, these summations are executed. In other words, the system identification circuit 108 sums the weighted error terms generated by steps 704-708 to generate a prediction performance function as:

$$V_N(\phi, Z^N) = \sum_{k=1}^{N-h_{max}+1} \sum_{h=0}^{h_{max}} w(h)\|y(k+h) - \hat{y}(k+h|k-1, \phi)\|_2^2. \quad \text{(Eq. M)}$$

The prediction performance function is a function of the input data $Z^N$ and the parameter variable ϕ. Typically, the input data $Z^N$ is given (i.e., received by the model identifier 412 and used in the calculation of error terms as described above). Thus, the prediction performance function is primarily a function of ϕ.

At step 712, the prediction performance function $V_N(\phi, Z^N)$ is minimized to find an optimal parameter vector $\hat{\theta}_N$=arg $\min_{\theta \in D_M} V_N(\phi, Z^N)$. Any minimization procedure may be followed. The result of step 712 is a vector $\hat{\phi}_N$ of identified model parameters that tune the model $\mathcal{M}$ ($\hat{\phi}_N$) to accurately predict system evolution multiple steps ahead. At step 714, the model identifier 412 provides the identified system model (i.e., $\mathcal{M}$ ($\hat{\phi}_N$)) to the model predictive controller 414 for use in generating control inputs for the HVAC equipment 210.

According to various embodiments, process 700 is run once at set-up to establish the system model, run periodically to update the system model, or run repeatedly/continuously to dynamically update the system model in real time.

Variable Refrigerant Flow Systems

Figure 9A:
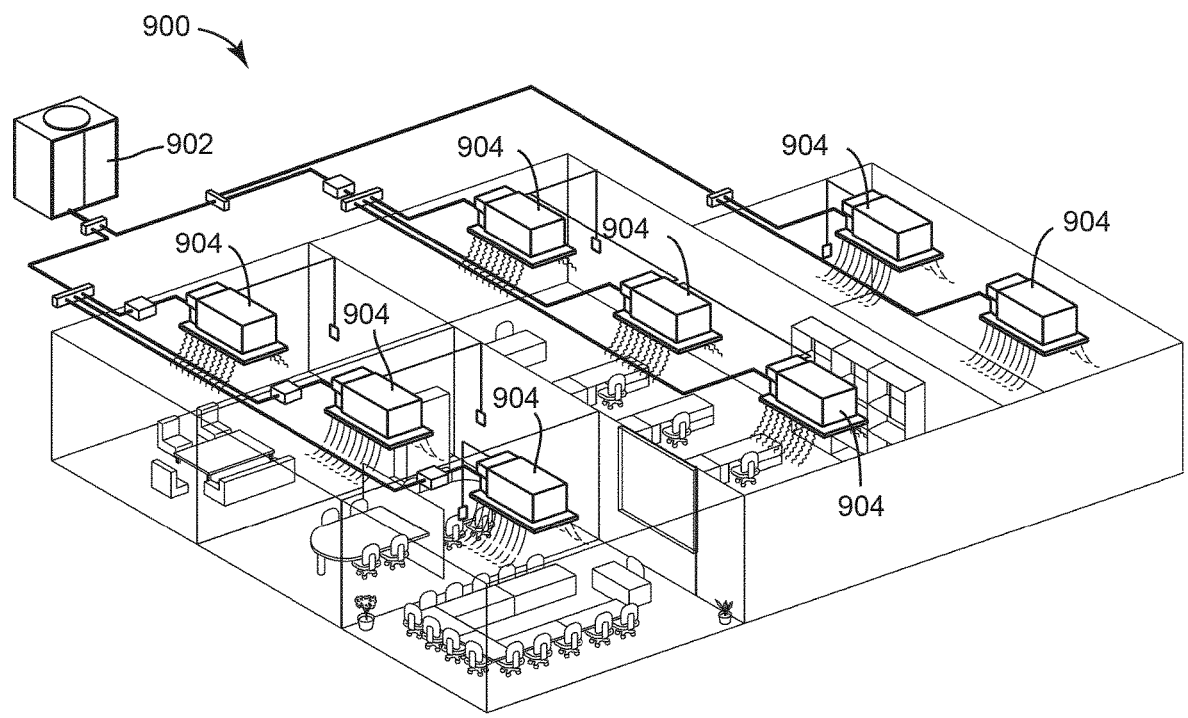
FIG. 9A is a first illustration of a variable refrigerant flow system for a building, according to some embodiments.
Figure 9B:
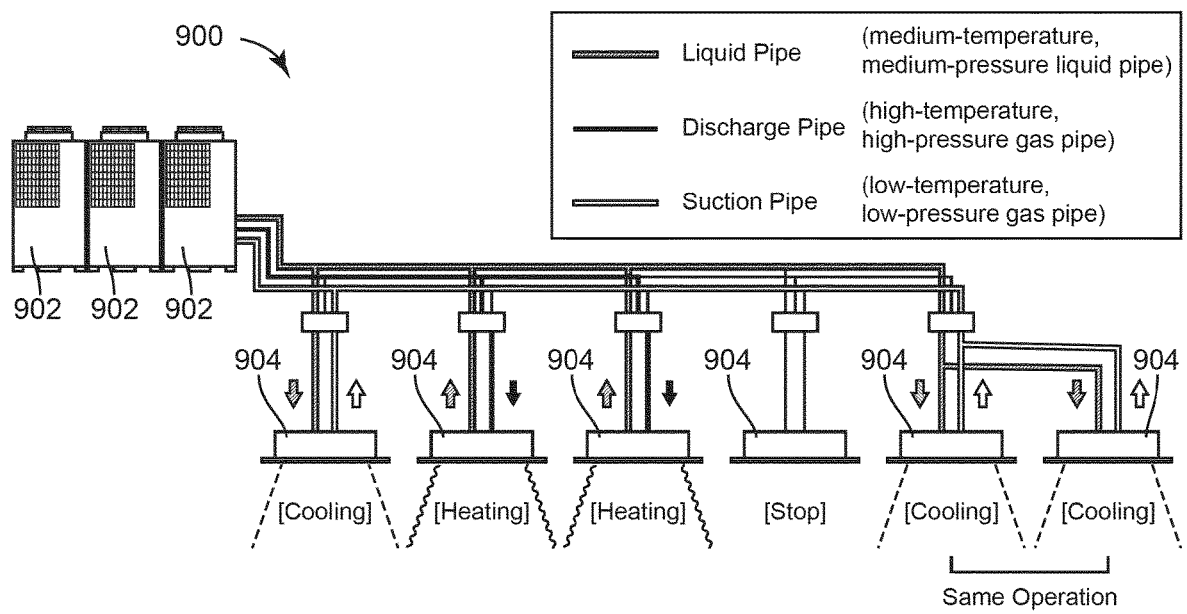
FIG. 9B is a second illustration of a variable refrigerant flow system for a building, according to some embodiments.

Referring now to FIGS. 9A-9B, a variable refrigerant flow (VRF) system 900 is shown, according to some embodiments. VRF system 900 is shown to include one or more outdoor VRF units 902 and a plurality of indoor VRF units 904. Outdoor VRF units 902 can be located outside a building and can operate to heat or cool a refrigerant. Outdoor VRF units 902 can consume electricity to convert refrigerant between liquid, gas, and/or super-heated gas phases. Indoor VRF units 904 can be distributed throughout various building zones within a building and can receive the heated or cooled refrigerant from outdoor VRF units 902. Each indoor VRF unit 904 can provide temperature control for the particular building zone in which the indoor VRF unit 904 is located. Although the term "indoor" is used to denote that the indoor VRF units 904 are typically located inside of buildings, in some cases one or more indoor VRF units are located "outdoors" (i.e., outside of a building) for example to heat/cool a patio, entryway, walkway, etc.

One advantage of VRF system 900 is that some indoor VRF units 904 can operate in a cooling mode while other indoor VRF units 904 operate in a heating mode. For example, each of outdoor VRF units 902 and indoor VRF units 904 can operate in a heating mode, a cooling mode, or an off mode. Each building zone can be controlled independently and can have different temperature setpoints. In some embodiments, each building has up to three outdoor VRF units 902 located outside the building (e.g., on a rooftop) and up to 128 indoor VRF units 904 distributed throughout the building (e.g., in various building zones). Building zones may include, among other possibilities, apartment units, offices, retail spaces, and common areas. In some cases, various building zones are owned, leased, or otherwise occupied by a variety of tenants, all served by the VRF system 900.

Many different configurations exist for VRF system 900. In some embodiments, VRF system 900 is a two-pipe system in which each outdoor VRF unit 902 connects to a single refrigerant return line and a single refrigerant outlet line. In a two-pipe system, all of outdoor VRF units 902 may operate in the same mode since only one of a heated or chilled refrigerant can be provided via the single refrigerant outlet line. In other embodiments, VRF system 900 is a three-pipe system in which each outdoor VRF unit 902 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system is described in detail with reference to FIG. 10.

Figure 10:
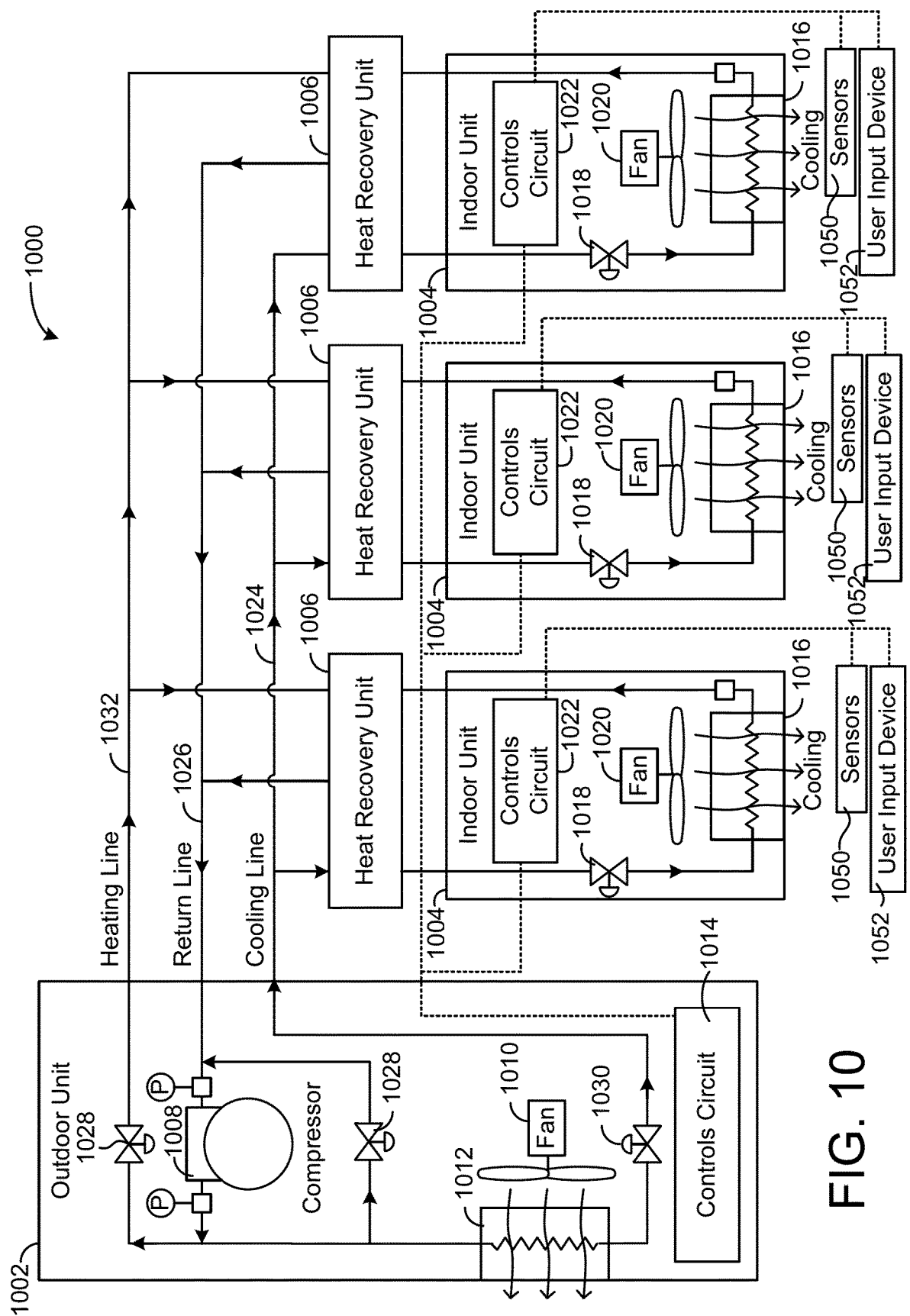
FIG. 10 is a detailed diagram of a variable refrigerant flow system for a building, according to some embodiments.

Referring now to FIG. 10, a block diagram illustrating a VRF system 1000 is shown, according to an exemplary embodiment. VRF system 1000 is shown to include outdoor VRF unit 1002, several heat recovery units 1006, and several indoor VRF units 1004. Although FIG. 10 shows one outdoor VRF unit 1002, embodiments including multiple outdoor VRF units 1002 are also within the scope of the present disclosure. Outdoor VRF unit 1002 may include a compressor 1008, a fan 1010, or other power-consuming refrigeration components configured convert a refrigerant between liquid, gas, and/or super-heated gas phases. Indoor VRF units 1004 can be distributed throughout various building zones within a building and can receive the heated or cooled refrigerant from outdoor VRF unit 1002. Each indoor VRF unit 1004 can provide temperature control for the particular building zone in which the indoor VRF unit 1004 is located. Heat recovery units 1006 can control the flow of a refrigerant between outdoor VRF unit 1002 and indoor VRF units 1004 (e.g., by opening or closing valves) and can minimize the heating or cooling load to be served by outdoor VRF unit 1002.

Outdoor VRF unit 1002 is shown to include a compressor 1008 and a heat exchanger 1012. Compressor 1008 circulates a refrigerant between heat exchanger 1012 and indoor VRF units 1004. The compressor 1008 operates at a variable frequency as controlled by VRF Controller 1014. At higher frequencies, the compressor 1008 provides the indoor VRF units 1004 with greater heat transfer capacity. Electrical power consumption of compressor 1008 increases proportionally with compressor frequency.

Heat exchanger 1012 can function as a condenser (allowing the refrigerant to reject heat to the outside air) when VRF system 1000 operates in a cooling mode or as an evaporator (allowing the refrigerant to absorb heat from the outside air) when VRF system 1000 operates in a heating mode. Fan 1010 provides airflow through heat exchanger 1012. The speed of fan 1010 can be adjusted (e.g., by VRF Controller 1014) to modulate the rate of heat transfer into or out of the refrigerant in heat exchanger 1012.

Each indoor VRF unit 1004 is shown to include a heat exchanger 1016 and an expansion valve 1018. Each of heat exchangers 1016 can function as a condenser (allowing the refrigerant to reject heat to the air within the room or zone) when the indoor VRF unit 1004 operates in a heating mode or as an evaporator (allowing the refrigerant to absorb heat from the air within the room or zone) when the indoor VRF unit 1004 operates in a cooling mode. Fans 1020 provide airflow through heat exchangers 1016. The speeds of fans 1020 can be adjusted (e.g., by indoor unit controls circuits 1022) to modulate the rate of heat transfer into or out of the refrigerant in heat exchangers 1016.

In FIG. 10, indoor VRF units 1004 are shown operating in the cooling mode. In the cooling mode, the refrigerant is provided to indoor VRF units 1004 via cooling line 1024. The refrigerant is expanded by expansion valves 1018 to a cold, low pressure state and flows through heat exchangers 1016 (functioning as evaporators) to absorb heat from the room or zone within the building. The heated refrigerant then flows back to outdoor VRF unit 1002 via return line 1026 and is compressed by compressor 1008 to a hot, high pressure state. The compressed refrigerant flows through heat exchanger 1012 (functioning as a condenser) and rejects heat to the outside air. The cooled refrigerant can then be provided back to indoor VRF units 1004 via cooling line 1024. In the cooling mode, flow control valves 1028 can be closed and expansion valve 1030 can be completely open.

In the heating mode, the refrigerant is provided to indoor VRF units 1004 in a hot state via heating line 1032. The hot refrigerant flows through heat exchangers 1016 (functioning as condensers) and rejects heat to the air within the room or zone of the building. The refrigerant then flows back to outdoor VRF unit via cooling line 1024 (opposite the flow direction shown in FIG. 10). The refrigerant can be expanded by expansion valve 1030 to a colder, lower pressure state. The expanded refrigerant flows through heat exchanger 1012 (functioning as an evaporator) and absorbs heat from the outside air. The heated refrigerant can be compressed by compressor 1008 and provided back to indoor VRF units 1004 via heating line 1032 in a hot, compressed state. In the heating mode, flow control valves 1028 can be completely open to allow the refrigerant from compressor 1008 to flow into heating line 1032.

As shown in FIG. 10, each indoor VRF unit 1004 includes an indoor unit controls circuit 1022. Indoor unit controls circuit 1022 controls the operation of components of the indoor VRF unit 1004, including the fan 1020 and the expansion valve 1018, in response to a building zone temperature setpoint or other request to provide heating/cooling to the building zone. The indoor unit controls circuit 1022 may also determine a heat transfer capacity required by the indoor VRF unit 1004 and transmit a request to the outdoor VRF unit 1002 requesting that the outdoor VRF unit 1002 operate at a corresponding capacity to provide heated/cooled refrigerant to the indoor VRF unit 1004 to allow the indoor VRF unit 1004 to provide a desired level of heating/cooling to the building zone.

Each indoor unit controls circuit 1022 is shown as communicably coupled to one or more sensors 1050 and a user input device 1052. In some embodiments, the one or more sensors 1050 may include a temperature sensor (e.g., measuring indoor air temperature), a humidity sensor, and/or a sensor measuring some other environmental condition of a building zone served by the indoor VRF unit 1004. In some embodiments, the one or more sensors include an occupancy detector configured to detect the presence of one or more people in the building zone and provide an indication of the occupancy of the building zone to the indoor unit controls circuit 1022.

Each user input device 1052 may be located in the building zone served by a corresponding indoor unit 1004. The user input device 1052 allows a user to input a request to the VRF system 1000 for heating or cooling for the building zone and/or a request for the VRF system 1000 to stop heating/cooling the building zone. According to various embodiments, the user input device 1052 may include a switch, button, set of buttons, thermostat, touchscreen display, etc. The user input device 1052 thereby allows a user to control the VRF system 1000 to receive heating/cooling when desired by the user.

The indoor unit controls circuit 1022 may thereby receive an indication of the occupancy of a building zone (e.g., from an occupancy detector of sensors 1050 and/or an input of a user via user input device 1052). In response, the indoor unit controls circuit 1022 may generate a new request for the outdoor VRF unit 1002 to operate at a requested operating capacity to provide refrigerant to the indoor unit 1004. The indoor unit controls circuit 1022 may also receive an indication that the building zone is unoccupied and, in response, generate a signal instructing the outdoor VRF unit 1002 to stop operating at the requested capacity. The indoor unit controls circuit 1022 may also control various components of the indoor unit 1004, for example by generating a signal to turn the fan 1020 on and off.

The outdoor unit controls circuit 1014 may receive heating/cooling capacity requests from one or more indoor unit controls circuits 1022 and aggregate the requests to determine a total requested operating capacity. Accordingly, the total requested operating capacity may be influenced by the occupancy of each of the various building zones served by various indoor units 1004. In many cases, a when a person or people first enter a building zone and a heating/cooling request for that zone is triggered, the total requested operating capacity may increase significantly, for example reaching a maximum operating capacity. Thus, the total request operating capacity may vary irregularly and unpredictably as a result of the sporadic occupation of various building zones.

The outdoor unit controls circuit 1014 is configured to control the compressor 1008 and various other elements of the outdoor unit 1002 to operate at an operating capacity based at least in part on the total requested operating capacity. At higher operating capacities, the outdoor unit 1002 consumes more power, which increases utility costs. In some embodiments, the VRF controller may be capable of For an operator, owner, lessee, etc. of a VRF system, it may be desirable to minimize power consumption and utility costs to save money, improve environmental sustainability, reduce wear-and-tear on equipment, etc. In some cases, multiple entities or people benefit from reduced utility costs, for example according to various cost apportionment schemes for VRF systems described in U.S. patent application Ser. No. 15/920,077 filed Mar. 13, 2018, incorporated by reference herein in its entirety. Thus, as described in detail below, the controls circuit 1014 may be configured to manage the operating capacity of the outdoor VRF unit 1002 to reduce utility costs while also providing comfort to building occupants. Accordingly, in some embodiments, the controls circuit 1014 may be operable in concert with systems and methods described in P.C.T. Patent Application No. PCT/US2017/039,937 filed Jun. 29, 2017, and/or U.S. patent application Ser. No. 15/635,754 filed Jun. 28, 2017, both of which are incorporated by reference herein in their entireties.

Clustering Analysis for Generating Zone Groupings
Overview

Referring generally to FIGS. 11-16, systems and methods for clustering predictive models based on model parameters are shown, according to some embodiments. In standard systems, HVAC and/or other building equipment may be controlled based on a constant setpoint (e.g., a temperature setpoint) that may be manually set or programmed. MPC can improve on standard systems by utilizing predictive models to anticipate how environmental conditions of the building may change and adjust operation of equipment accordingly. Advantageously, MPC can automatically determine a setpoint to utilize that optimizes (e.g., minimizes) energy costs while maintaining conditions within acceptable ranges that are comfortable to occupants. However, if MPC is performed, for example, for individual zones of a building, MPC may take a significant amount of time to complete. In fact, if the amount of zones requiring MPC calculations is large enough, MPC may fail to provide an optimized setpoint at a first time step as a result of performing MPC calculations zone by zone. Delays in providing setpoints/control signals to building equipment can result in reduced energy cost savings, failure to maintain occupant comfort, and/or other undesirable outcomes.

To mitigate effects of delay in performing MPC, zones can be clustered into zone groups. By performing a clustering analysis, zone group models (i.e., predictive models for zone groups instead of individual zones) can be generated such that a single MPC calculation can be performed for multiple zones within the building. Utilizing zone group models can significantly reduce overall processing time of MPC as fewer MPC calculations may be required for a building.

Traditional systems for generating single models representing multiple zones (e.g., multiple rooms) lack the ability to account for variations in system dynamics across zones. Typically, traditional systems simply assemble model parameters from multiple discrete models into a matrix or vector such that each row of the matrix or vector includes the original model parameters from one of the original predictive models. This approach differs from the systems and methods described in detail below which perform calculations to generate an aggregate value of particular model parameters. Specifically, the systems and methods described herein can apply original values of model parameters as inputs to an equation (e.g., a summation, a more complicated equation for parallel combinations, etc.) that calculates a new value of the model parameter for use in an aggregate model. As compared to the models generated by traditional systems, the aggregate model can include aggregate values of model parameters and can be used in a single optimization (and/or other control process) to generate optimization results for multiple zones. Advantageously, this reduces complexity of the aggregate model (i.e., the aggregate model does not need to store individual parameters for each zone) and can reduce computational time as a single optimization (and/or other control process) can be applied to multiple zones once.

Performing a Clustering Analysis of Predictive Models

Figure 11:
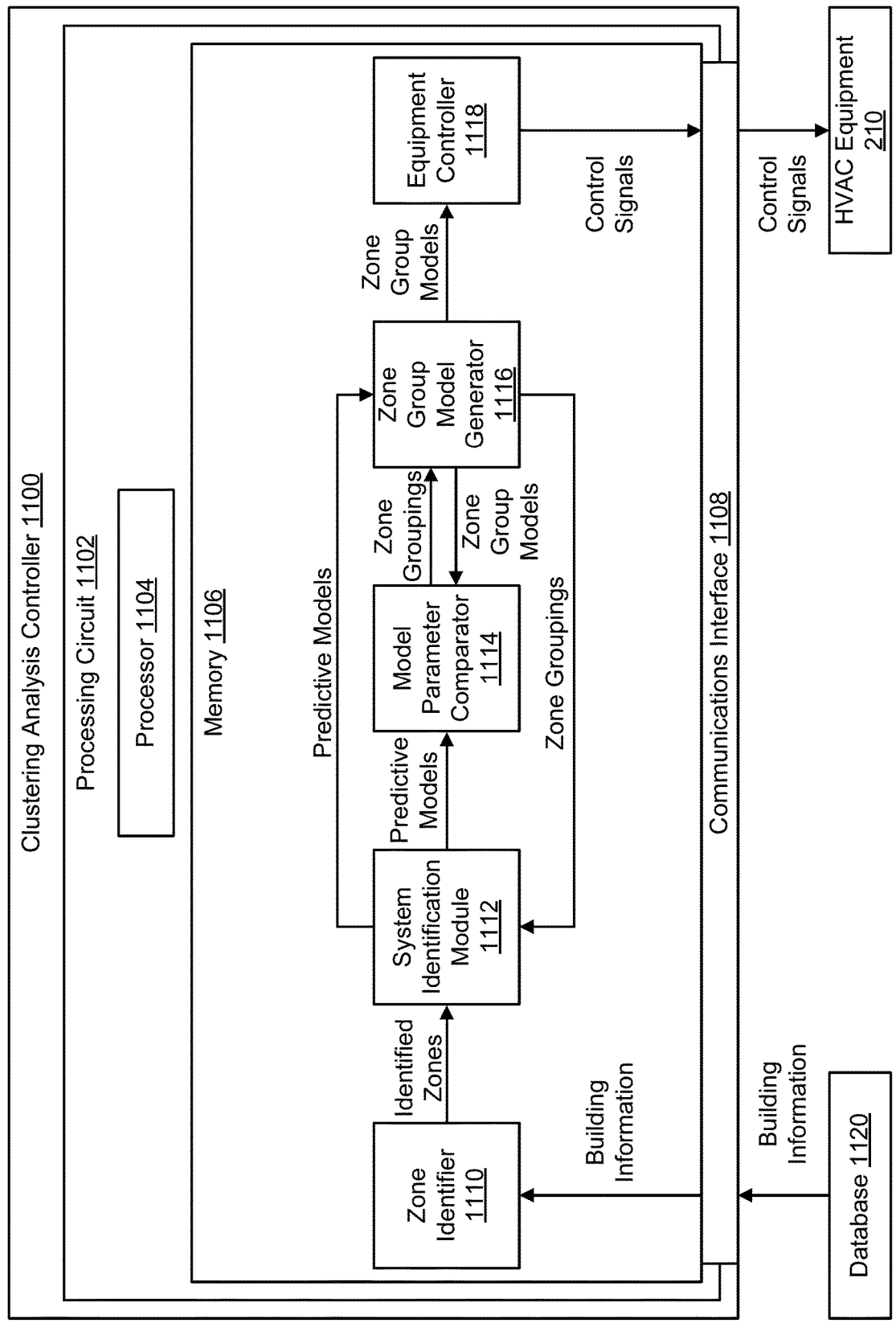
FIG. 11 is a block diagram of a clustering analysis controller for performing a clustering analysis process, according to some embodiments.

Referring now to FIG. 11, a clustering analysis controller 1100 for performing a clustering analysis process is shown, according to some embodiments. In some embodiments, clustering analysis controller 1100 is similar to and/or the same as controller 212 as described with reference to FIGS. 2 and 4. As such, clustering analysis controller 1100 can include some and/or all of the functionality of controller 212. Clustering analysis controller 1100 can be implemented in a variety of settings. For example, clustering analysis controller 1100 can be implemented as a controller within a building system. As another example, clustering analysis controller 1100 can be hosted on a cloud server and can provide control signals to HVAC equipment 210 over various wired and/or wireless communication media. As another example, clustering analysis controller 1100 can be hosted on a desktop computer of a building operator that may be on or off site.

Clustering analysis controller 1100 is shown to include a communications interface 1108 and a processing circuit 1102. Communications interface 1108 may include wired or wireless interfaces (e.g., jacks, antennas, transmitters, receivers, transceivers, wire terminals, etc.) for conducting data communications with various systems, devices, or networks. For example, communications interface 1108 may include an Ethernet card and port for sending and receiving data via an Ethernet-based communications network and/or a Wi-Fi transceiver for communicating via a wireless communications network. Communications interface 1108 may be configured to communicate via local area networks or wide area networks (e.g., the Internet, a building WAN, etc.) and may use a variety of communications protocols (e.g., BACnet, IP, LON, etc.).

Communications interface 1108 may be a network interface configured to facilitate electronic data communications between clustering analysis controller 1100 and various external systems or devices (e.g., a database 1120, HVAC equipment 210, etc.). For example, clustering analysis controller 1100 may receive building information from database 1120 via communications interface 1108. In some embodiments, communications interface 1108 is configured to provide control signals to HVAC equipment 210. In some embodiments, clustering analysis controller 1100 utilizes communications interface 1108 to distribute corrective action instructions to external devices, controllers, systems, etc.

Still referring to FIG. 11, processing circuit 1102 is shown to include a processor 1104 and memory 1106. Processor 1104 may be a general purpose or specific purpose processor, an application specific integrated circuit (ASIC), one or more field programmable gate arrays (FPGAs), a group of processing components, or other suitable processing components. Processor 1104 may be configured to execute computer code or instructions stored in memory 1106 or received from other computer readable media (e.g., CDROM, network storage, a remote server, etc.).

Memory 1106 may include one or more devices (e.g., memory units, memory devices, storage devices, etc.) for storing data and/or computer code for completing and/or facilitating the various processes described in the present disclosure. Memory 1106 may include random access memory (RAM), read-only memory (ROM), hard drive storage, temporary storage, non-volatile memory, flash memory, optical memory, or any other suitable memory for storing software objects and/or computer instructions. Memory 1106 may include database components, object code components, script components, or any other type of information structure for supporting the various activities and information structures described in the present disclosure. Memory 1106 may be communicably connected to processor 1104 via processing circuit 1102 and may include computer code for executing (e.g., by processor 1104) one or more processes described herein. In some embodiments, one or more components of memory 1106 are part of a singular component. However, each component of memory 1106 is shown independently for ease of explanation.

Memory 1106 is shown to include a zone identifier 1110. Zone identifier 1110 is shown to receive building information from database 1120 via communications interface 1108. The building information can include various information describing a building for which MPC can be performed. The building information can include information such as, for example, a size of the building, a number of rooms of the building, historic data describing dynamics of the building, predefined zones of the building, etc. In some embodiments, the building information is and/or includes a building information model (BIM) file and/or a computer aided design (CAD) file.

Database 1120 can be any type of database (e.g., relational, non-relational, NoSQL, etc.) that can be configured to store the building information describing the building. In some embodiments, database 1120 is a cloud database that clustering analysis controller 1100 can access (e.g., by the Internet). In some embodiments, database 1120 is a component of clustering analysis controller 1100 (e.g., a component of memory 1106). In some embodiments, zone identifier 1110 receives building information from a source other than or in addition to database 1120. For example, zone identifier 1110 can receive building information from a user device, sensors in the building, a third-party provider, etc.

Based on the building information, zone identifier 1110 can identify zones of the building. In some embodiments, the zones are explicitly indicated by the building information, in which case zone identifier 1110 can directly extract the zones from the building information. In some embodiments, the zones are not explicitly indicated by the building information. If the zones are not explicitly indicated by the building information, zone identifier 1110 can identify zones of the building based on available information. For example, if the building information lists rooms of the building, zone identifier 1110 may define each room as a zone. As another example, zone identifier 1110 may associate each floor of the building as a zone. As yet another example, zone identifier 1110 can analyze dynamics (e.g., thermal dynamics) of the building indicated by the building information to identify areas of the building with similar dynamics to define as zones. Zone identifier 1110 can utilize various information of the building information to identify zones of the building.

Zone identifier 1110 can provide identified zones to a system identification (SI) module 1112. In some embodiments, SI module 1112 is similar to and/or the same as model identifier 412 as described with reference to FIG. 4. As such, SI module 1112 can include some and/or all of the functionality of system parameter identifier 418 and/or gain parameter identifier 420. In some embodiments, the SI process performed by SI module 1112 is described in greater detail in U.S. patent application Ser. No. 15/953,324 filed Apr. 13, 2018 and in U.S. patent application Ser. No. 16/418,715 filed May 21, 2019, the entireties which are incorporated by reference herein.

SI module 1112 can perform a system identification process for each zone identified by zone identifier 1110. In this way, SI module 1112 can generate a predictive model for each zone of the building. For example, SI module 1112 can generate a thermal model for zones as defined by the following differential equations:

$$C_{ia}\dot{T}_{ia} = \frac{1}{R_{mi}}(T_m - T_{ia}) + \frac{1}{R_{oi}}(T_{oa} - T_{ia}) + \dot{Q}_{HVAC} + \dot{Q}_{other}$$

$$C_m \dot{T}_m = \frac{1}{R_{mi}}(T_{ia} - T_m)$$

where $T_{ia}$ is an indoor air temperature, $T_{oa}$ is an outdoor air temperature, $T_m$ is a lumped thermal mass temperature, $C_m$ is a lumped mass thermal capacitance, $C_{ia}$ is an indoor air thermal capacitance, $R_{mi}$ is an indoor air thermal mass thermal resistance, $R_{oi}$ is a thermal resistance between indoor air and outdoor air, $\dot{Q}_{HVAC}$ is a sensible heat provided to/removed from a building space from an HVAC system (e.g., including HVAC equipment 210), and $\dot{Q}_{other}$ is an internal heat load/gains. $\dot{Q}_{other}$ can result from sources of heat disturbances such as, for example, solar radiation, occupancy, and/or electrical equipment.

Inputs to the above thermal model can include $\dot{Q}_{HVAC}$ which can be measured and controlled, $T_{oa}$ which can be measured but not controlled, and $\dot{Q}_{other}$ which may not be measured or controlled. States of the building thermal model can include a measured state of $T_{ia}$ and an unmeasured state of $T_m$. An output of the thermal model can include $T_{ia}$ as a measured output. Obtaining the resistances and capacitances (i.e., $C_{ia}$, $C_m$, $R_{mi}$, $R_{oi}$) can be done through system identification where data for a building zone is collected and used to fit the parameters that provide accurate predictions of the building thermal dynamics. As an example, clustering analysis controller 1100 can identify the matrices A, B, C, and D (i.e., the values of $\theta = \{\theta_1, \theta_2, \theta_3, \theta_4, \theta_5, \theta_6\}$) of Eqs. G and H as described above with reference to FIG. 5. The values of $\theta$ can then be used to calculate the values of the thermal resistances, capacitances, and other parameters that combine to form the values of $\theta$ (e.g., using the equations that define the values of $\theta$ as functions of these parameters, as described with reference to FIG. 3). In other words, clustering analysis controller 1100 can be configured to determine the values of $C_{ia}$, $C_m$, $R_{mi}$, $R_{oi}$, $K_{p,j}$, and/or $K_{i,j}$.

SI module 1112 can provide the predictive models of the zones to a model parameter comparator 1114. Based on the predictive models, model parameter comparator 1114 can perform a clustering analysis to determine zone groupings for the zones. To perform the clustering analysis, model parameter comparator 1114 can compare model parameters of the predictive models to identify similarities between zones. If zones have similar dynamics, values of model parameters for their respective predictive models may be similar. For example, two zones on a same side of a building may experience similar heat disturbances due to solar effects. As such, a model parameter associated with heat disturbance may have a similar value in a predictive model for each zone. In some embodiments, parameters derived from the model parameters are compared by model parameter comparator 1114 independent or in addition to the model parameters. For example, a time constant indicating an amount of time it may take for an environmental condition of a zone to adjust based on operation of building equipment can be derived based on the model parameters. The time constant derived from model parameters of one predictive model can then be compared against time constants derived from model parameters of other predictive models to determine if associated zones are similar.

To determine if two or more predictive models are similar (and therefore if the associated zones are similar), model parameters of the predictive models can be compared. Various comparison methodologies can be utilized by model parameter comparator 1114 to determine if model parameters are similar. For example, model parameter comparator 1114 can calculate a standard deviation of values of a particular model parameter for a set of predictive models. If the standard deviation is below some threshold value, model parameter comparator 1114 may determine the model parameters are similar. As another example, model parameter comparator 1114 can perform an outlier analysis on model parameters to determine if model parameters are similar. Examples of some outlier analyses that model parameter comparator 1114 can perform include multivariate outlier analysis, a univariate outlier analysis, DBCAN, isolation forest, Z-Score, etc. If any model parameters are identified as an outlier, a predictive model associated with the outlier may be determined to not be similar to the other predictive models of the outlier analysis. It should be appreciated that similarity of values can be determined through various calculations and/or other determinations depending on how an entity (e.g., a user, model parameter comparator 1114, etc.) defines similarity of values. In some embodiments, the outlier analysis performed by model parameter comparator 1114 is described in greater detail in U.S. patent application Ser. No. 16/442,103 filed Jun. 14, 2019 and/or in U.S. patent application Ser. No. 16/512,712 filed Jul. 16, 2019, both of which are incorporated by reference herein in their entirety.

In some embodiments, model parameter comparator 1114 defines a minimum number of model parameters that are required to be similar in order for predictive models to be grouped together. For example, if a predictive model for thermal dynamics has ten model parameters, model parameter comparator 1114 may require at least seven to be determined to be similar based on a similarity threshold (e.g., a maximum standard deviation, no outlier variables, etc.). In some embodiments, model parameter comparator 1114 requires all model parameters to be similar for predictive models considered similar and to be grouped together. Requirements for similarity of predictive models can be defined by a user, by clustering analysis controller 1100, by an external device/system, and/or any other entity associated with the clustering analysis process. The requirements for similarity can vary depending on how strict an entity desires model parameters to be for models to be considered similar. For example, similarity may be defined as ±5% of a value of a model parameter of a specific model, ±10% of a value of a model parameter of a specific model, ±20% of a value of a model parameter of a specific model, within one standard deviation of the median or mean of a set of peer values, etc.

Model parameter comparator 1114 can generate zone groups (shown as zone groupings in FIG. 11) based on what predictive models are determined to be similar. For example, if a building include zones A, B, C, and D such that zones A and B are similar and zones C and D are similar, model parameter comparator 1114 can define a first zone group as including zones A and B and can define a second zone group including zones C and D. In other words, zones A and B may have similar values of model parameters and zones C and D may have similar values of model parameters. However, a larger zone group may not be reasonable if model parameters of the first zone group are significantly different than model parameters of the second zone group. In some embodiments, generation of zone groups that can be performed by model parameter comparator 1114 and/or other components of clustering analysis controller 1100 is described in greater detail in U.S. patent application Ser. No. 16/442,103 filed Jun. 14, 2019 and/or U.S. patent application Ser. No. 16/512,712 filed Jul. 16, 2019, both of which are incorporated by reference herein in their entireties.

A zone group defined by model parameter comparator 1114 can include various numbers of zones. For example, a zone group can include one zone, two zones, ten zones, etc. If model parameter comparator 1114 determines no zones of the building are similar, model parameter comparator 1114 can define a zone group for each zone such that each zone group includes one zone. In general, if a building has n zones, model parameter comparator 1114 can define m zone groups where m≤n. In some embodiments, generating fewer zone groups (i.e., generating zone groups with more zones) results in additional computational savings over generating more zone groups as larger zone groups can reduce the number of MPC calculations that need to be performed. As such, model parameter comparator 1114 may attempt to reduce the number of zone groups as much as possible without jeopardizing validity of MPC decisions.

Model parameter comparator 1114 can provide the determined zone groups to a zone group model generator 1116. For each zone group, zone group model generator 1116 can generate a zone group model. In some embodiments, zone group models are generated by generating an aggregate predictive model and/or by performing an additional SI process, both of which are described in greater detail below. Generating an aggregate predictive model may be a computationally simplistic algorithm as compared to performing the additional SI process. However, the additional SI process may generate more accurate zone group models for use in MPC. As such, zone group model generator 1116 can determine whether to generate aggregate predictive models or instruct SI module 1112 to perform the additional SI process for each zone group.

In some embodiments, zone group model generator 1116 generates aggregate predictive models and instructs SI module 1112 to perform the additional SI process. In this case, zone group model generator 1116 may compare the aggregate predictive models to the predictive models generated by the additional SI process to estimate how accurate the aggregate predictive models are in comparison to models generated by the additional SI process. Said estimation can be used in future clustering analyses to determine whether to generate aggregate predictive models or to immediately perform another SI process with the zone groups. Specifically, if aggregate predictive models are sufficiently accurate (e.g., as determined based on outputs of the aggregate predictive models as compared to outputs of models generated by the additional SI process), aggregation may be performed in future clustering analyses for computational efficiency as overall accuracy of the zone group models may be maintained.

In some embodiments, zone group model generator 1116 generates aggregate predictive models for some zone groups and performs additional SI processes for other zone groups. In particular, for zone groups where model parameters of each predictive model of zones are close (e.g., values of the model parameters are within a predetermined range of one another, the values are the same, etc.), aggregation may be more appropriate. In cases where model parameters of predictive models of zones in a zone group are more spread out, the additional SI processes may be more appropriate.

If zone group model generator 1116 determines an aggregate predictive model should be generated for a zone group to function as a zone group model, zone group model generator 1116 can combine predictive models for each zone of the zone group. As such, zone group model generator 1116 can receive the predictive models of the zones in the zone group from SI module 1112 for use in aggregation. As an example, zone group model generator 1116 may generate an aggregate predictive model describing thermal dynamics for a zone group including p zones. Generating the aggregate predictive model can include calculating an aggregate value of each model parameter of the aggregate predictive model. For example, zone group model generator 1116 can calculate aggregate values of capacitances (e.g., $C_m$ and $C_{ia}$) and resistances (e.g., $R_{mi}$ and $R_{oi}$) of each predictive model in a zone group. An aggregate indoor air thermal capacitance value $C_{ia}$ can be calculated by zone group model generator 1116, for example, by the following equation:

$$C_{ia} = C_{ia,1} + C_{ia,2} + \ldots + C_{ia,p}$$

where $C_{ia,p}$ is an indoor air thermal capacitance value of a predictive model of a $p^{th}$ zone. As another example, an aggregate indoor air thermal mass thermal resistance $R_{mi}$ can be calculated by zone group model generator 1116 using the following equation:

$$\frac{1}{R_{mi}} = \frac{1}{R_{mi,1}} + \frac{1}{R_{mi,2}} + \cdots + \frac{1}{R_{mi,p}}$$

where $R_{mi,p}$ is an indoor air thermal mass thermal resistance of the predictive model of the $p^{th}$ zone.

It should be appreciated that some model parameters may be able to be added directly while other model parameters may require special equations for aggregation. With regards to the capacitance and resistance equations above, capacitances are proportional to the volume of air within a zone group so capacitance values can be added directly by zone group model generator 1116. However, the resistances may be arranged in parallel with each other in a thermal circuit (e.g., similar to and/or the same as shown in diagram 300 as described with reference to FIG. 3) since each resistance can represent a different source of heat transfer that contributes to the overall heat transfer into the space. As such, the resistances may not be able to be directly added by zone group model generator 1116. Other model parameters of the aggregate predictive model may be determined via different calculations/approaches such as, for example, calculating an average value of all model parameters, determining a mean value, multiplying values, selecting a maximum value, etc. In any case, by calculating an aggregate value of each model parameter, the aggregate predictive model (i.e., the zone group model) can account for each zone of the associated zone group.

If zone group model generator 1116 determines a second SI process should be performed to generate a zone group model for a zone group, zone group model generator 1116 can provide the zone group to SI module 1112. Based on the zone group, SI module 1112 can perform a system identification process for the zone group to generate a zone group model encompassing dynamics of zones in the zone group. Generating zone group models by system identification may be more computationally expensive as compared to calculating aggregate values of model parameters as described above. However, generating zone group models by system identification may result in more accurate zone group models as compared to performing aggregation of model parameters. If SI module 1112 generates zone group models for zone groups, SI module 1112 can provide the zone group models back to zone group model generator 1116.

As an example of the SI process for zone groups performed by SI module 1112, if a zone group includes five zones, SI module 1112 can perform an SI process based on training data associated with each of the five zones. SI module 1112 can utilize information such as indoor temperatures of the zones, building equipment available in each zone, sizes of each zones, compositions of walls of each zone, etc. In this way, the SI process can capture not only dynamics within each zone, but may be able to capture dynamics between each of the five zones as well in a generated zone group model. For example, the SI process may capture heat transfer via walls between zones in a zone group model. A zone group model generated based on the SI process for the zone group can be used to determine operating setpoints for building equipment affecting any and/or all of the five zones within the zone group.

As a result of performing model parameter aggregation and/or additional SI processes, zone group models describing each zone group determined by model parameter comparator 1114 can be generated. In some embodiments, zone group model generator 1116 provides the zone group models to an equipment controller 1118 for use in MPC and/or another control-based application.

In some embodiments, zone group model generator 1116 provides the generated zone group models back to model parameter comparator 1114 to perform an additional clustering analysis with the zone group models to determine if clustering of zone groups is possible. Clustering of zone groups may result in zone groups being combined such that the combined zone groups describe a greater number of zones than the individual zone groups. If zone groups are further clustered by model parameter comparator 1114, model parameter comparator 1114 can provide the combined zone groups back to zone group model generator 1116 to generate zone group models describing the combined zone groups. In other words, for a combined zone group, zone group model generator 1116 can generate a new zone group model that accounts for each zone of each zone group in the combined zone group. As such, performing additional clustering analyses may further reduce computational complexity of MPC by resulting in zone group models being generated that described larger numbers of zones. The clustering analysis performed by model parameter comparator 1114 on the zone groups may be similar to and/or the same as that performed based on predictive models for individual zones (i.e., comparison of model parameters and/or parameters derived therefrom). In this way, the clustering analysis performed on the zone groups can utilize model parameters of zone group models and/or parameters derived therefrom to determine if grouping of zone groups is possible. In effect, if the clustering analysis on zone groups results in two or more zone groups being combined, a new zone group model encompassing all zones within each zone group of the combined zone group can be generated.

In some embodiments, model parameter comparator 1114 and zone group model generator 1116 continue performing new clustering analyses and thereby generating larger zone group models as long as a previous clustering analysis determined at least two zone groups could be clustered. In other words, new clustering analyses can be performed as long as a previous clustering analysis resulted in generation of a new zone group model that encompasses a combination of zone groups. In this way, model parameter comparator 1114 and zone group model generator 1116 can maximize an amount of clustering to further reduce computational complexity of MPC. In some embodiments, model parameter comparator 1114 and zone group model generator 1116 set a maximum number of iterations that additional clustering analyses can be performed. For example, the maximum number of iterations can be set as two iterations, four iterations, ten iterations, etc. The maximum number of iterations can be particularly useful in buildings with a large number of zones such that a total time of all clustering analyses is bounded.

In some embodiments, model parameter comparator 1114 restricts requirements for zone group models to be identified as similar upon further iterations of clustering. By restricting similarity requirements, model parameter comparator 1114 can avoid generating zone groups that are too broad (i.e., zone groups that encompass too many zones). While maximizing clustering can reduce overall computational complexity of MPC, zone group models associated with extremely broad zone groups may fail to maintain occupant comfort in particular zones and/or may result in reduced operational savings as compared to more specific zone group models (i.e., predictive models encompassing fewer zones). In this way, restricting similarity requirements can reduce a probability of zone groups that encompass large amounts of zones (e.g., 50% of the zones in a building, 80% of the zones in a building, etc.) being determined. Restricting similarity requirements can include various actions such as, for example, lowering an acceptable standard deviation between values of model parameters, performing outlier analyses that have more strict requirements for what is not considered an outlier, etc.

Regardless of whether model parameter comparator 1114 performs a single clustering analysis or multiple clustering analyses, zone group model generator 1116 can generate a final set of zone group models. Each zone group model in the final set of zone group models can encompass dynamics of one or more zones of the building. As described above, the final set of zone group models can characterize m zone groups for n zones where m≤n. By performing the clustering analysis/analyses, each of the zone group models in the final set of zone group models can describe dynamics encompassing zones that are determined to be similar to one another. In this way, a single MPC calculation performed to determine control actions for building equipment (e.g., HVAC equipment 210) for the similar zones. Zone group model generator 1116 can provide the final set of zone group models to equipment controller 1118.

Based on the zone group models, equipment controller 1118 can perform MPC to generate control signals to provide to HVAC equipment 210 via communications interface 1108. If at least two zones are successfully clustered in the clustering analysis performed by model parameter comparator 1114, the amount of time for performing MPC may be reduced for the building as fewer MPC calculations need to be performed as a result of the associated zone group model. By utilizing the zone group models, an amount of time required to generate control signals for building equipment (e.g., HVAC equipment 210) associated with each zone can be reduced. In this way, the building equipment can be operated based on optimized control signals at an earlier time as compared to performing MPC for each zone individually.

Figure 12A:
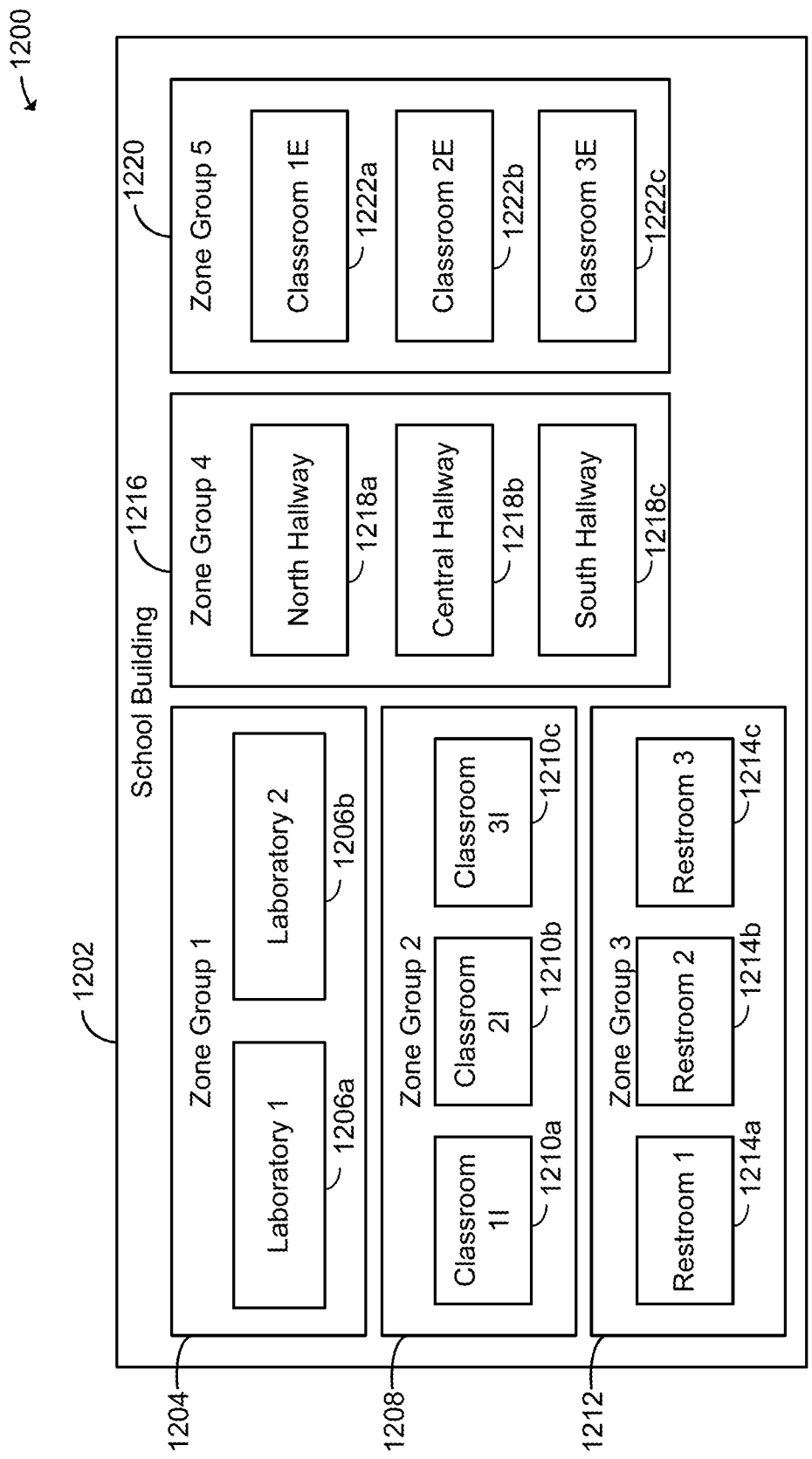
FIG. 12A is a first example of a zone grouping generated by the model parameter comparator of FIG. 11, according to some embodiments.
Figure 12B:
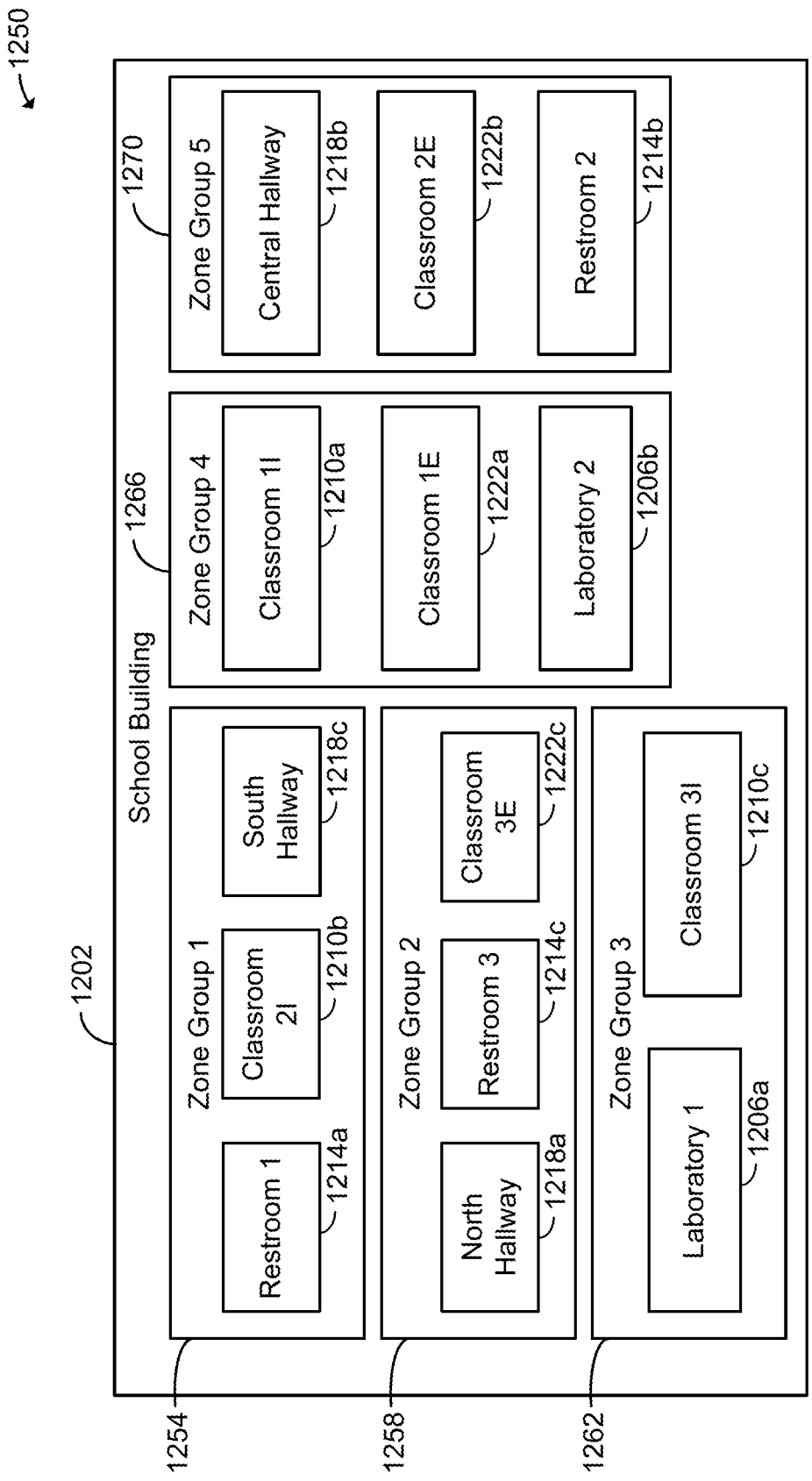
FIG. 12B is a second example of a zone grouping generated by the model parameter comparator of FIG. 11, according to some embodiments.

Referring now to FIG. 12A and FIG. 12B, examples of various zone groupings that can be generated for a building based on an experimental clustering analysis are shown, according to some embodiments. FIGS. 12A and 12B are shown to include a structure 1202 functioning as a school, according to some embodiments. In some embodiments, structure 1202 is shown to include laboratories 1206*a* and 1206*b* (referred to collectively as laboratories 1206), interior classrooms 1210*a*, 1210*b*, and 1210*c* (referred to collectively as interior classrooms 1210), restrooms 1214*a*, 1214*b*, and 1214c (referred to collectively as restrooms 1214), hallways 1218a, 1218b, and 1218c (referred to collectively as hallways 1218), and exterior classrooms 1222a, 1222b, and 1222c (referred to collectively as exterior classrooms 1222). In some embodiments, the zones in structure 1202 were grouped using model parameter comparator 1114. Each of the individual zones in structure 1202 were identified using zone identifier 1110 as described with reference to FIG. 11, according to some embodiments. In some embodiments, model parameter comparator 1114 generated multiple zone groupings based on the individual zones. While FIGS. 12A and 12B illustrate example zone groupings that can be generated, model parameter comparator 1114 can generate any appropriate zone grouping based on comparisons of model parameters and/or parameters derived therefrom.

Referring specifically to FIG. 12A, a first zone grouping 1200 generated based on an experimental clustering analysis is shown, according to some embodiments. First zone grouping 1200 is shown to include a zone group one 1204 including laboratories 1206, a zone group two 1208 including classrooms 1210, a zone grouping three 1212 including restrooms 1214, a zone group four 1216 including hallways 1218, and a zone group five 1220 including classrooms 1222, according to some embodiments.

Referring specifically to FIG. 12B, a second zone grouping 1250 based on the experimental clustering analysis of FIG. 12A is shown, according to some embodiments. Second zone grouping 1250 is shown to include a zone group one 1254 including restroom 1214a, classroom 1210b, and south hallway 1218c, a zone group two 1258 including north hallway 1218a, restroom 1214c, and classroom 1222c, a zone grouping three 1262 including laboratory 1206a and classroom 1210c, a zone group four 1266 including classroom 1210a, classroom 1222a, and laboratory 1206b, and a zone group five 1270 including central hallway 1218b, classroom 1222b, and restroom 1214b, according to some embodiments.

Prior to the generation of first zone grouping 1200 and second zone grouping 1250, each zone in structure 1202 was identified by zone identifier 1110, according to some embodiments. Following the identification of each zone in structure 1202, zone data is collected for each zone in structure 1202 to be utilized by SI module 1112, according to some embodiments. Based on the zone data, SI module 1112 can generate predictive models for each zone in structure 1202. SI module 1112 can provide the predictive models describing each zone of structure 1202 to model parameter comparator 1114. Based on the predictive models, model parameter comparator 1114 can perform one or more clustering analyses to generate zone groups for structure 1202. The clustering analyses performed by model parameter comparator 1114 generated first zone grouping 1200 and second zone grouping 1250 for use in VRF control. In some embodiments, if two or more zone groupings are generated, a user selects which zone grouping to utilize in VRF control. Said zone groups can be provided to zone group model generator 1116 to generate zone group models for structure 1202.

Figure 13:
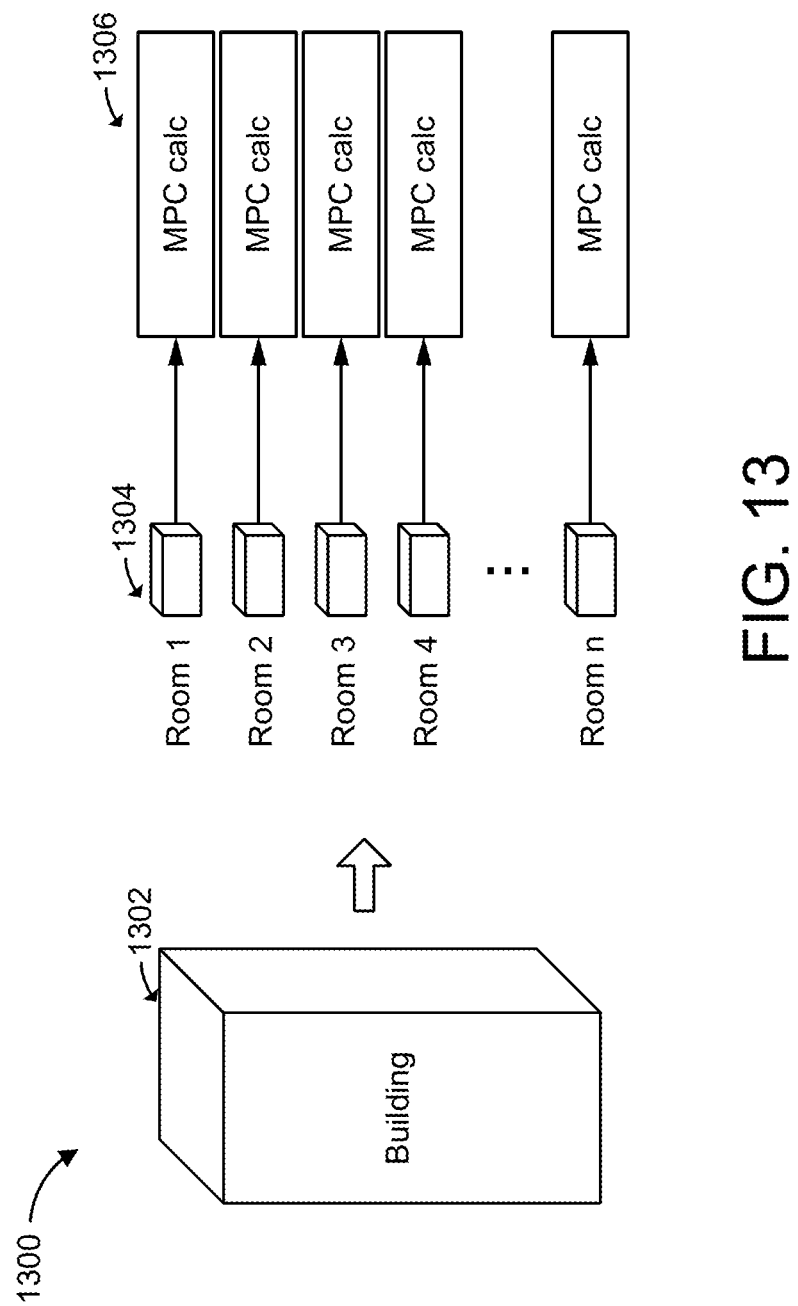
FIG. 13 is a flow diagram of a process for performing model predictive control (MPC) without clustering zones, according to some embodiments.

Referring now to FIG. 13, a flow diagram of a process 1300 for performing MPC without clustering zones is shown, according to some embodiments. Process 1300 can illustrate inefficiencies related to performing MPC for individual zones (e.g., each room) of a building without performing a clustering analysis. In some embodiments, some and/or all steps of process 1300 can be performed by components of clustering analysis controller 1100.

Process 1300 is shown to include gathering building information describing a building (step 1302). The building information can be obtained from various sources such as from sensors in the building that collect data regarding the building, from a database storing the building information, from information provided by a user, etc. The building information can include any information necessary for performing MPC such as a layout of the building, thermal dynamics of a building, etc. In some embodiments, step 1302 is performed by zone identifier 1110.

Process 1300 is shown to include identifying zones of a building (step 1304). As illustrated in process 1300, each zone is associated with a single room of the building for sake of example. In this case, if n rooms exist in the building, n zones can be identified. Of course, rooms are used as a basis for zones of the building purely for sake of example. Zones can be identified based on various criteria and may include one or more rooms depending on a layout, dynamics, and/or other aspects of the building. In some embodiments, step 1304 includes generating predictive models for each zone. The predictive models can be generated by performing system identification processes. By performing the system identification processes, n predictive models can be generated for each of the n zones (i.e., the n rooms of the building). In some embodiments, step 1304 is performed by zone identifier 1110 and/or SI module 1112.

Process 1300 is shown to include performing MPC calculations for each of the predictive models (step 1306). As process 1300 does not include a clustering analysis, MPC calculations are performed for each of the n predictive models. Performing MPC calculations for each of the n predictive models can result in larger computational expenditure as compared to if some of the n zones were combined into zone groups with associated zone group models. In some embodiments, step 1306 is performed by equipment controller 1118.

Figure 14:
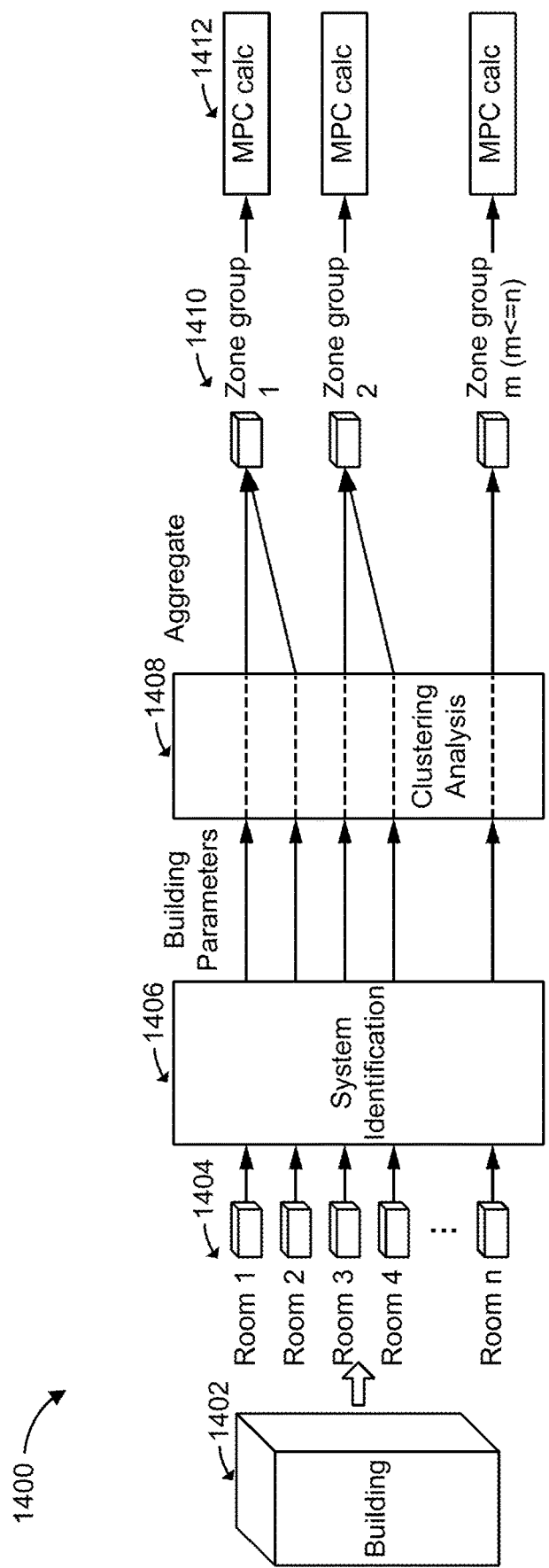
FIG. 14 is a flow diagram of a process for performing MPC based on a clustering analysis, according to some embodiments.

Referring now to FIG. 14, a flow diagram of a process 1400 for performing MPC based on a clustering analysis is shown, according to some embodiments. If compared to process 1300 as described with reference to FIG. 13, benefits of performing a clustering analysis can be illustrated. In particular, by performing process 1400, fewer MPC calculations are necessary as compared to a number of MPC calculations performed in process 1300. In some embodiments, some and/or all steps of process 1400 are performed by are performed by components of clustering analysis controller 1100.

Process 1400 is shown to include gathering building information describing a building (step 1402) and identifying zones of a building (step 1404). In some embodiments, steps 1402 and 1404 are similar to and/or the same as steps 1302 and 1304 as described with reference to FIG. 13, respectively. Process 1400 is also shown to include performing system identification processes to identify predictive models for each zone (step 1406). In some embodiments, step 1406 is similar to and/or the same as the system identification processes described above with reference to step 1304 of process 1300. By performing the system identification processes, n predictive models can be generated for each of the n zones of the building. Each predictive model can include model parameters (i.e., building parameters as shown in process 1400) that can be utilized in comparative analyses in process 1400. In some embodiments, step 1406 is performed by SI module 1112.

Process 1400 is shown to include performing a clustering analysis on each of the predictive models (step 1408). To perform the clustering analysis, step 1408 can include comparing/analyzing model parameters of each of the predictive models. In some embodiments, parameters derived from the model parameters (e.g., a time constant) are compared/analyzed separately and/or in conjunction to the model parameters. If model parameters are determined to be similar, the associated zones can be placed into zone groups.

Various comparisons/analyses can be performed in step 1408 to determine whether model parameters are similar. For example, step 1408 may include calculating a standard deviation of values of the model parameters. If the standard deviation is below some threshold value (e.g., as set by a user, set by a controller, etc.), the model parameters can be determined to be similar. As another example, step 1408 may include performing an outlier analysis to determine outlier values of the model parameters. If a model parameter is identified as an outlier, a zone of the associated predictive model may not be grouped with the other zones. In some embodiments, for a zone to be allocated into a zone group, a minimum number of model parameters of an associated predictive model are required to be similar. For example, if a predictive model has ten model parameters, the minimum number of model parameters can be set such that seven of the ten model parameters must be similar to the model parameters of other predictive models. As a result of performing step 1408, m zone groups can be identified such that m≤n (i.e., the number of zone groups is not greater than the number of predictive models). In some embodiments, step 1408 is performed by model parameter comparator 1114.

Process 1400 is shown to include generating zone group models for each zone group (step 1410). For each of the m zone groups identified in step 1408, a zone group model can be generated. In some embodiments, a zone group model for a zone group is generated by aggregating model parameters of each of the predictive models of zones of the zone group. In some embodiments, the zone group model is generated by performing another system identification process for the entire zone group. Performing the additional system identification process may increase computational expenditure as compared to aggregation of model parameters, however, the additional system identification process may result in more accurate zone group models. As such, step 1410 may include comparing computing costs (e.g., cloud computing costs) versus anticipated operational savings from a more accurate predictive model. If anticipated operational savings are higher than the computing costs, the additional system identification process may be performed. If the computing costs are higher than the anticipated operational savings, aggregation of model parameters may be performed.

In some embodiments, step 1410 includes performing additional clustering analyses (e.g., by repeating step 1408) based on the zone group models. If model parameters of the zone group models are similar, the associated zone groups may be similar. As such, combining the zone groups may further reduce computational complexity of MPC without sacrificing occupant comfort and/or significant operational cost savings. In this way, step 1410 can include generating aggregate models for combined zone groups if further grouping is performed past the initial zone grouping. In some embodiments, step 1410 is performed by model parameter comparator 1114, zone group model generator 1116, and/or SI module 1112.

Process 1400 is shown to include performing MPC calculations for each zone group (step 1412). Based on the zone group models for each zone group, a single MPC calculation can be performed for each zone group. Results of the MPC calculations can be provided as control signals to building equipment to operate in order to achieve an optimal control over heating, cooling, and/or other environmental conditions. Step 1412 illustrates benefits of the clustering analysis as compared to step 1306 of process 1300. In particular, if at least two zones are grouped into a single zone group, a number of computationally expensive MPC calculations can be reduced. Further, the clustering analysis performed in process 1400 may be less computationally expensive than MPC calculations and therefore may not significantly impact overall running time of MPC. In some embodiments, step 1412 is performed by equipment controller 1118.

Figure 15:
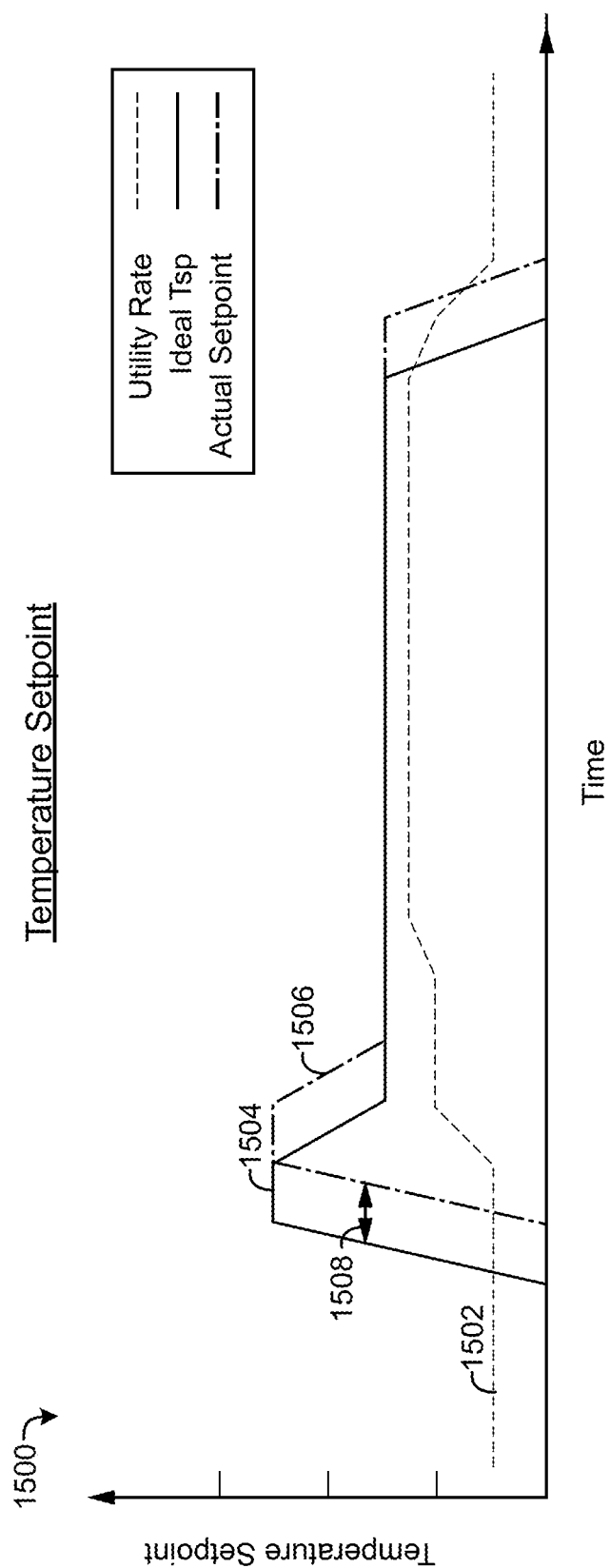
FIG. 15 is a graph illustrating an impact of delays in performing MPC calculations, according to some embodiments.

Referring now to FIG. 15, a graph 1500 illustrating an impact of delays in performing MPC calculations is shown, according to some embodiments. Graph 1500 is shown to particularly illustrate impacts of delays on a temperature setpoint. However, other setpoints (e.g., humidity setpoint, air quality setpoint, etc.) may be similarly affected due to delays in performing MPC calculations. Graph 1500 is shown to include a series 1502, a series 1504, and a series 1506. Series 1502 can illustrate a cost of utilities (e.g., electricity, water, etc.) over time. Over time series 1502 is shown to change in values as a result of changing costs associated with utilities. For example, the cost of utilities may change as a result of electricity becoming more expensive during peak demand periods. Series 1504 can illustrate an ideal temperature setpoint that maintains occupant comfort within some predefined temperature bounds and optimizes (e.g., reduces) costs. In effect, series 1504 can illustrate outputs of MPC if no delay exists. Series 1506 can illustrate values of an actual temperature setpoint generated by performing MPC given some time delay due to a processing time of MPC calculations.

Graph 1500 is also shown to include a delay 1508. Delay 1508 can illustrate an amount of time that building equipment (e.g., HVAC equipment 210) is not operated based on optimal control decisions as a result of the delay in performing MPC calculations. As a length of delay 1508 increases, additional operational costs may be incurred as building equipment is not operated based on optimal control decisions. As shown in graph 1500, series 1506 incurs additional operational costs as compared to series 1504. In particular, series 1506 includes operating the building equipment at higher setpoints during periods of increased utility costs as represented by series 1502. In other words, as a result of delay 1508, operation of the building equipment based on setpoints of series 1506 is more expensive due to higher utility costs. Therefore, performing a clustering analysis can reduce the length of delay 1508 and can result in higher operational cost savings over time.

Figure 16:
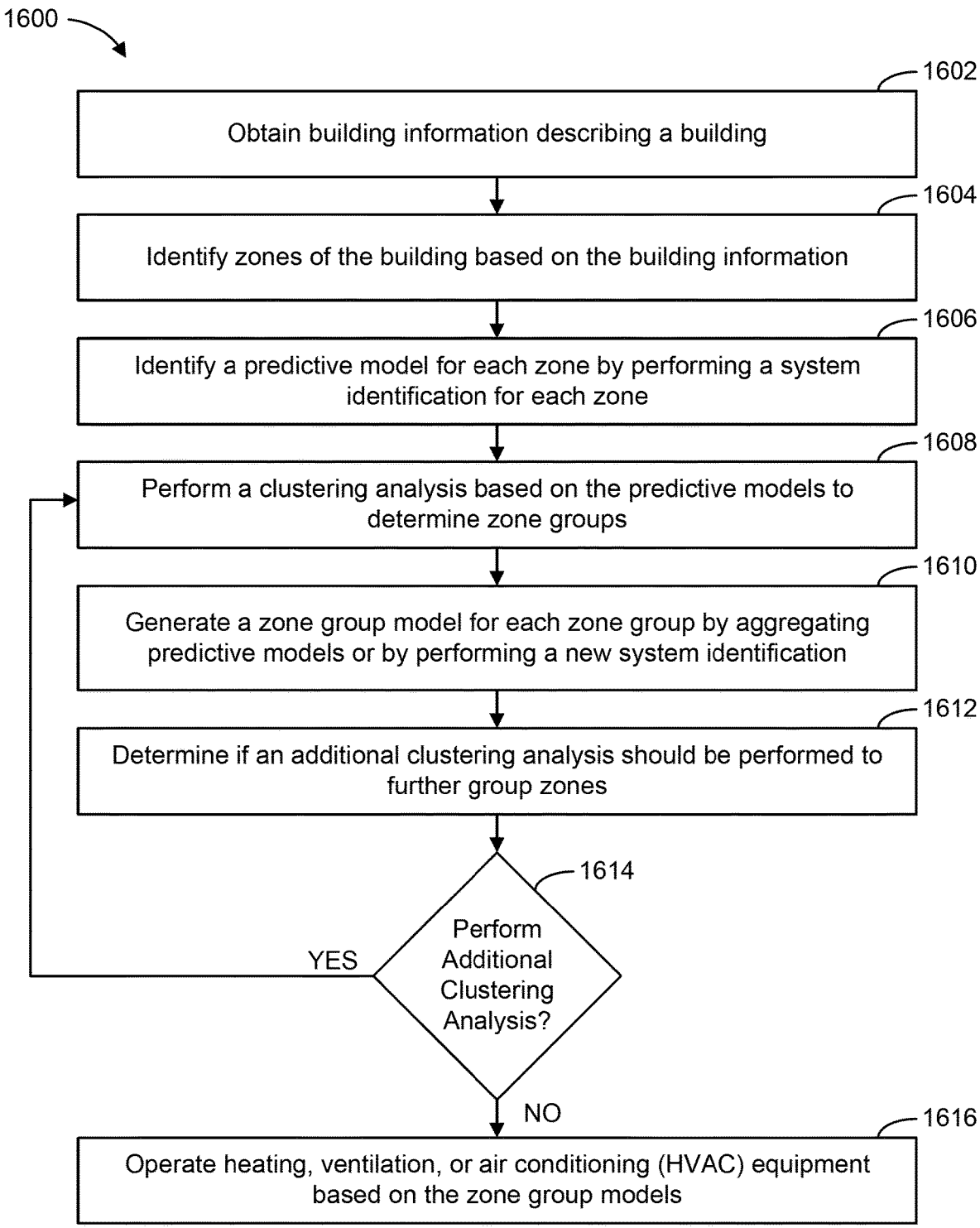
FIG. 16 is a process for performing a clustering analysis based on model parameters of predictive models, according to some embodiments.

Referring now to FIG. 16, a process 1600 for performing a clustering analysis based on model parameters of predictive models is shown, according to some embodiments. In some embodiments, process 1600 is similar to and/or the same as process 1400 as described with reference to FIG. 14. By performing process 1600, zones of a building can be grouped together based on model parameters of predictive models associated with the zones. In this way, control-based applications such as MPC can utilize zone group models as describing the zone groups as opposed to the predictive models describing the zones, thereby simplifying computational complexity of performing said control-based applications. In some embodiments, process 1600 is performed by clustering analysis controller 1100 and/or components therein.

Process 1600 is shown to include obtaining building information describing a building (step 1602). In some embodiments, step 1602 is similar to and/or the same as step 1402 of process 1400. The building information can be obtained from various sources such as from sensors in the building that collect data regarding the building, from a database storing the building information, from information provided by a user, etc. The building information can include any information necessary for identifying zones of the building such as a layout of the building, thermal dynamics of a building, building equipment in the building, etc. In some embodiments, step 1602 is performed by zone identifier 1110.

Process 1600 is shown to include identifying zones of the building based on the building information (step 1604). In some embodiments, step 1604 is similar to and/or the same as step 1404 of process 1400. The zones of the building can be identified based on various information included in the building information. For example, the building information may explicitly indicate the zones of the building. As another example, the zones of the building can be identified based on what building equipment affects various portions of the building. As another example, the zones may be identified based on rooms indicated by the building information. As yet another example, the zones may be identified based on measured values of environmental conditions (e.g., average indoor temperature, average relative humidity, etc.) at different locations within the building. In some embodiments, zone groups are provided by a separate entity and are not directly identified in step 1604. For example, a user may set zones of the building and override zones inherently or explicitly indicated in the building information. In any case, step 1604 can result in n zones of the building determined. In some embodiments, step 1604 is performed by zone identifier 1110.

Process 1600 is shown to include identifying a predictive model for each zone by performing a system identification for each zone (step 1606). In some embodiments, step 1606 is similar to and/or the same as step 1406 of process 1400. For a given zone, the system identification can determine values of model parameters describing dynamics of the zone. For example, if the predictive model is a thermal dynamics model of the zone, the system identification may include determining values of model parameters associated with a thermal capacitance of the zone, an outdoor-indoor thermal resistance, etc. The system identifications can utilize various the building information received in step 1602 to determine the values of the model parameters. For example, the system identifications may utilize measurements of indoor/outdoor temperature, sizes of zones, where the zones are located in relation to the rest of the building, materials that walls and other parts of the building are comprised of, etc. In essence, step 1606 can include identifying a predictive model for each zone identified in step 1604. In some embodiments, the predictive models are obtained via other sources. For example, the predictive models can be obtained from a database (e.g., a cloud database) storing predictive models describing the building. In some embodiments, step 1606 is performed by SI module 1112.

Process 1600 is shown to include performing a clustering analysis based on the predictive model to determine zone groups (step 1608). In some embodiments, step 1608 is similar to and/or the same as step 1408 of process 1400. Step 1608 can include performing various comparison/analyses on the model parameters of the predictive models identified in step 1606. For example, step 1608 can include calculating a standard deviation of values of the model parameters, performing an outlier analysis (e.g., a multivariate outlier analysis, Z-Score, DBCAN, isolation forest, etc.) on the model parameters, etc. In some embodiments, comparisons/analyses are performed on parameters that can be derived from the model parameters. For example, comparisons/analyses can be performed on a time constant derived from model parameters where the time constant describes an amount of time it takes for environmental conditions of a zone to change based on operation of building equipment.

Based on the comparison/analyses, model parameters that are similar can be identified. In some embodiments, for model parameters of predictive models to be considered similar, the model parameters must meet a similarity threshold. Dependent on the comparisons/analyses performed, the similarity threshold may take on different forms. For example, if the comparisons/analyses include calculating a standard deviation between values of the model parameters, the similarity threshold can be a maximum acceptable value of the standard deviation between the model parameters. If the standard deviation is below the maximum acceptable value, the model parameters can be considered similar. The similarity threshold can be set and adjusted by various entities (e.g., a user, a controller, etc.) based on how much variance between model parameters is acceptable for zones to be grouped together.

As a result of performing the clustering analysis, zones associated with predictive models with similar model parameters can be grouped together into zone groups. The zone groups can include various numbers of zones depending on what predictive models have similar values of model parameters. In some embodiments, a maximum number of zones is set such that a zone group cannot have more than the maximum number of zones. The maximum number of zones can reduce a probability of extremely broad zone groups being generated that over-generalize zone dynamics. If a number of zones in a zone group will exceed the maximum number of zones, a determination can be made regarding what predictive models are least similar to other predictive models of zones in the zone group. The dissimilar predictive models can be reallocated to other zone groups and/or to a new zone group(s). In some embodiments, no maximum number of zones exists for zone groups. In some embodiments, step 1608 is performed by model parameter comparator 1114.

Process 1600 is shown to include generating a zone group model for each zone group by aggregating predictive models or by performing a new system identification (step 1610). In some embodiments, step 1610 is similar to and/or the same as step 1410 of process 1400. A given zone group can include one or more individual zones each associated with a predictive model (i.e., a zone model). In some embodiments, model parameters of each predictive model can be aggregated to generate composite values of model parameters for a zone group model for the zone group. Aggregation of predictive models can include various operations such as adding values of the model parameters, calculating an average of the values, determining a mean value, predicting a most accurate value of all model parameters, etc. As an example, an aggregate indoor air thermal capacitance value $C_{ia}$ can be calculated using the following equation:

$$C_{ia}=C_{ia,1}+C_{ia,2}+\ldots+C_{ia,n}$$

where $C_{ia,p}$ is an indoor air thermal capacitance value of a predictive model of an $n^{th}$ zone of the zone group. As another example, an aggregate indoor air thermal mass thermal resistance $R_{mi}$ can be calculated using the following equation:

$$\frac{1}{R_{mi}} = \frac{1}{R_{mi,1}} + \frac{1}{R_{mi,2}} + \cdots + \frac{1}{R_{mi,n}}$$

where $R_{mi,p}$ is an indoor air thermal mass thermal resistance of the predictive model of the $n^{th}$ zone of the zone group.

In some embodiments, step 1610 includes performing a new system identification for each zone group. In other words, step 1610 can include, for each zone group, performing a new system identification based on a combination of all zones in a zone group. A new system identification for a zone group can be performed based on dynamics describing each zone of the zone group. In this way, the new system identification can capture all dynamics of each zone into a cohesive zone group model.

In some embodiments, step 1610 includes performing either the aggregation process or the new system identification process. In some embodiments, step 1610 includes performing both the aggregation process and the new system identification process. If both processes are performed, step 1610 may include analyzing the zone group models generated via each process to determine how different the zone group models resulting from each process are. While the new system identification process may generate more accurate zone group models, the new system identification process may be more computationally expensive than the aggregation process. As such, comparisons between the zone group models generated by each process can be made to determine an additional cost savings (e.g., as a function of operational savings versus computational expenses) of performing the new system identification process or the aggregation process. If the additional cost savings is higher in regards to performing the new SI process, the new SI process may be automatically utilized in future clustering analyses. However, if the additional cost savings is higher for the aggregation process (i.e., the zone group models generated by each process are relatively similar), the aggregation process may be automatically utilized in future clustering analyses. The comparison between the aggregation process or new SI process can be particularly useful depending on a cost of computing costs (e.g., cloud computing costs) as reduction in computational complexity of generating zone group models can result in additional overall savings.

In some embodiments, the aggregation process is utilized for some zone groups and the new SI process is used for other zone groups. In particular, if predictive models of a zone group have model parameters that are all extremely close in values as determined in step 1608, performing aggregation of the predictive models may be appropriate. However, if values of the model parameters for a separate zone group are more spread out (e.g., have a higher standard deviation), performing the new SI process may be appropriate. In this way, the amount of new SI processes can be reduced in comparison to automatically performing SI for each zone group.

As a result of performing step 1610, zone group models can be generated for each zone group. The zone group models can describe thermal dynamics of all zones within each zone group. Advantageously, MPC calculations only need to be performed for each zone group model as compared to a predictive model of each zone individually. As each MPC calculation can take significant amounts of time (e.g., >30 seconds), reducing an amount of MPC calculations can result in reduced computing costs, reduced time delay before building equipment is operated, etc. In some embodiments, step 1610 is performed by zone group model generator 1116 and/or SI module 1112.

Process 1600 is shown to include determining if an additional clustering analysis should be performed to further group zones (step 1612). In some embodiments, the zone groups determined in step 1608 and the zone group models generated in step 1610 can be further combined, thereby leading to larger zone groups and fewer required MPC calculations. The determination made in step 1612 can be based on various factors. For example, the determination may be made based on a current number of zone groups. If too many zone groups exist (e.g., only n−1 zone groups exist where n is a number of zones in the building), the zone groups can be further grouped to reduce the number of MPC calculations. As another example, the determination can be made based on whether any grouping occurred in step 1608. If grouping did occur in step 1608, further grouping may be possible and another clustering analysis may be worthwhile to attempt. If grouping did not occur in step 1608, further clustering analyses may be fruitless as the zone groups in a current iteration of the clustering analysis may be substantially different from one another. In some embodiments, step 1612 is performed by model parameter comparator 1114 and/or zone group model generator 1116.

Process 1600 is shown to include a determination of whether to perform an additional clustering analysis (step 1614). Step 1614 can be based on the determination made in step 1612. If an additional clustering analysis should be performed (step 1614, "YES"), process 1600 can repeat starting at step 1608. It should be appreciated that, if process 1600 repeats starting at step 1608, the new clustering analysis performed in step 1608 can be based on the zone group models as opposed to the predictive models of the individual zones. If the additional clustering analysis should not be performed (step 1614, "NO"), process 1600 can continue to step 1616. In some embodiments, step 1614 is performed by zone group model generator 1116.

Process 1600 is shown to include operating heating, ventilation, or air conditioning (HVAC) equipment based on the zone group models (step 1616). An MPC calculation can be performed for each zone group model in order to generate control decisions for HVAC equipment (and/or other building equipment) within each zone group. Advantageously, operating decisions for a zone group can be applied to each zone of the zone group. For example, if an MPC calculation for a zone group based on a zone group model generates an operating temperature setpoint of 72° F., said operating temperature setpoint can be applied to all applicable zones of the zone group. In this way, a single MPC calculation can applied to each zone of the zone group, thereby reducing a number of MPC calculations so long as the zone group includes more than one zone. In some embodiments, step 1616 is performed by equipment controller 1118.

Zone Group Model Aggregation

Figure 17:
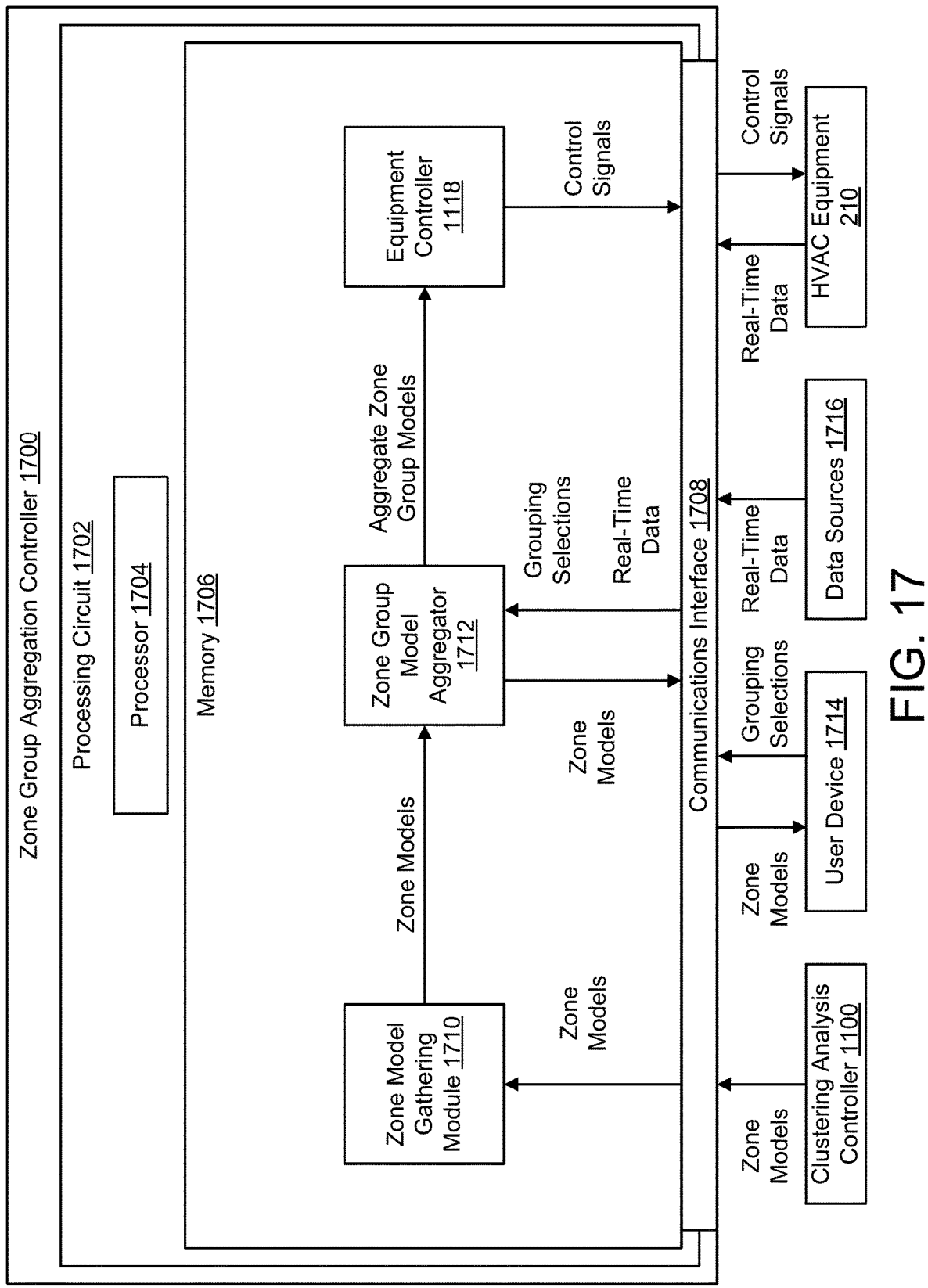
FIG. 17 is a block diagram of a zone group aggregation controller, according to some embodiments.
Figure 18:
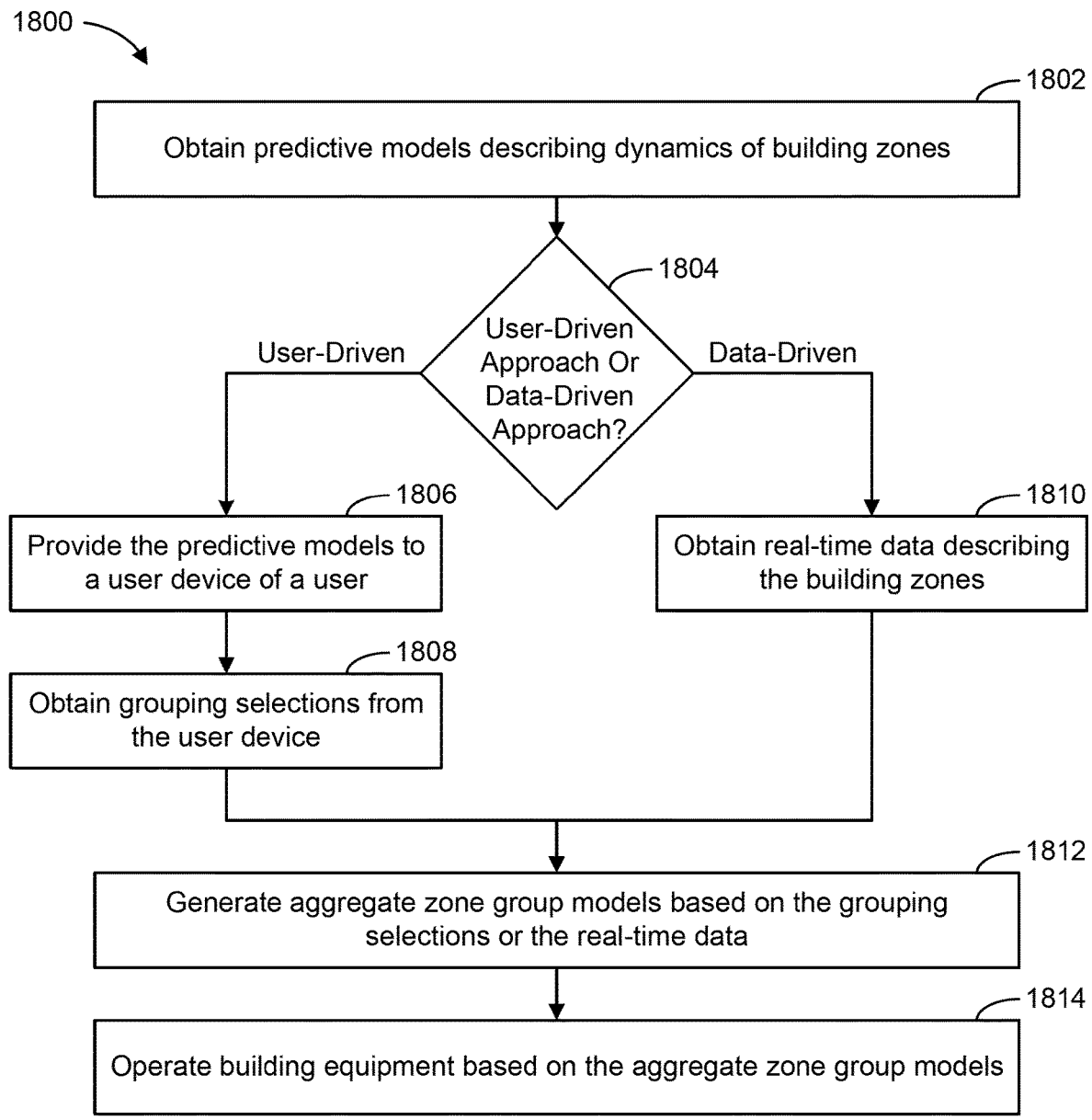
FIG. 18 is a flow diagram of a process for performing zone group model aggregation, according to some embodiments.

Referring generally to FIGS. 17 and 18, systems and methods for grouping zones and generating aggregate zone group models are shown and described, according to some embodiments. FIGS. 17 and 18 can illustrate how model parameters of individual zone models (i.e., individual predictive models) can be aggregated into combined zone group models. Said aggregation may be performed independently and/or in addition to the peer analysis process described above with reference to FIGS. 11-16.

In some embodiments, the predictive models described below describe zone groups. In this case, the predictive models may account for one or more zones of the building. If predictive models describe zone groups of the building, the predictive models can be similarly used to generate a combined group model by aggregating model parameters of the predictive models. However, predictive models associated with individual zones are primarily referred to throughout the description of FIGS. 17 and 18 for ease of explanation.

Referring now to FIG. 17, a zone group aggregation controller 1700 is shown, according to some embodiments. In some embodiments, zone group aggregation controller 1700 is similar to and/or the same as clustering analysis controller 1100 as described with reference to FIG. 11. Accordingly, some and/or all of the components and functionality of zone group aggregation controller 1700 as described in detail below and as shown in FIG. 17 may be integrated in clustering analysis controller 1100. However, zone group aggregation controller 1700 is shown separately for ease of explanation.

Zone group aggregation controller 1700 is shown to include a communications interface 1708 and a processing circuit 1702. Communications interface 1708 may include wired or wireless interfaces (e.g., jacks, antennas, transmitters, receivers, transceivers, wire terminals, etc.) for conducting data communications with various systems, devices, or networks. For example, communications interface 1708 may include an Ethernet card and port for sending and receiving data via an Ethernet-based communications network and/or a Wi-Fi transceiver for communicating via a wireless communications network. Communications interface 1708 may be configured to communicate via local area networks or wide area networks (e.g., the Internet, a building WAN, etc.) and may use a variety of communications protocols (e.g., BACnet, IP, LON, etc.).

Communications interface 1708 may be a network interface configured to facilitate electronic data communications between zone group aggregation controller 1700 and various external systems or devices (e.g., clustering analysis controller 1100, HVAC equipment 210, etc.). For example, zone group aggregation controller 1700 may receive real-time data from HVAC equipment 210 via communications interface 1708. In some embodiments, communications interface 1708 is similar to and/or the same as communications interface 1108 as described with reference to FIG. 11.

Still referring to FIG. 17, processing circuit 1702 is shown to include a processor 1704 and memory 1706. Processor 1704 may be a general purpose or specific purpose processor, an application specific integrated circuit (ASIC), one or more field programmable gate arrays (FPGAs), a group of processing components, or other suitable processing components. Processor 1704 may be configured to execute computer code or instructions stored in memory 1706 or received from other computer readable media (e.g., CDROM, network storage, a remote server, etc.).

Memory 1706 may include one or more devices (e.g., memory units, memory devices, storage devices, etc.) for storing data and/or computer code for completing and/or facilitating the various processes described in the present disclosure. Memory 1706 may include random access memory (RAM), read-only memory (ROM), hard drive storage, temporary storage, non-volatile memory, flash memory, optical memory, or any other suitable memory for storing software objects and/or computer instructions. Memory 1706 may include database components, object code components, script components, or any other type of information structure for supporting the various activities and information structures described in the present disclosure. Memory 1706 may be communicably connected to processor 1704 via processing circuit 1702 and may include computer code for executing (e.g., by processor 1704) one or more processes described herein. In some embodiments, one or more components of memory 1706 are part of a singular component. However, each component of memory 1706 is shown independently for ease of explanation.

Memory 1706 is shown to include a zone model gathering module 1710. Zone model gathering module 1710 can be configured to obtain zone models (i.e., predictive models) for use in an aggregation process. As shown in FIG. 17, zone model gathering module 1710 can obtain zone models from clustering analysis controller 1100. It should be appreciated that if zone group aggregation controller 1700 is integrated with clustering analysis controller 1100, the zone models may be readily available to zone model gathering module 1710. In other words, if zone group aggregation controller 1700 is integrated with clustering analysis controller 1100, zone models may not be required to be gathered from an external source. In some embodiments, the zone models are obtained from a source other than clustering analysis controller 1100. For example, the zone models may be obtained from a cloud and/or local database storing zone models, from other controllers, directly from a user (e.g., a building manager), etc. In some embodiments, zone models are obtained from a variety of sources dependent on where the zone models are stored and/or otherwise accessible.

In some embodiments, zone model gathering module 1710 distributes requests to sources that can provide zone models. In this case, zone model gathering module 1710 may distribute requests for zone models responsive to some determination that new/updated zone models should be obtained. For example, zone model gathering module 1710 may determine that new zone models have been generated, a predefined amount of time has passed since zone models were last acquired, a new run of MPC is about to be and/or is being performed such that new zone models may be required, etc. In some embodiments, zone model gathering module 1710 automatically receives zone models. In this case, sources of zone models (e.g., clustering analysis controller 1100) may automatically provide the zone models to zone model gathering module 1710.

Based on the obtained zone models, zone model gathering module 1710 can provide the zone models to a zone group model aggregator 1712. Zone group model aggregator 1712 can perform an aggregation process to generate an aggregate zone group model based on individual zone models. However, before zone group model aggregator 1712 can generate aggregate zone group models, zone group model aggregator 1712 may be required to determine what zones to include in a particular zone group. In other words, zone group model aggregator 1712 may be required to determine what model parameters from particular zone models to aggregate into a combined zone group model.

In some embodiments, zone group model aggregator 1712 can aggregate zone group models with other zone group models and/or individual zone models into combined zone group models. In this case, zone group model aggregator 1712 may perform the same process as described below but with respect to zone groups. However, individual zone groups are described in detail below for sake of clarity.

Given M zones associated with M zone models, zone group model aggregator 1712 can determine one or more zone groups to bucket the M zones and zone models into for aggregation. To determine the one or more zone groups, zone group model aggregator 1712 may utilize a user-driven approach or a data-driven approach, both of which are described in detail below. In some embodiments, the approach to utilize is determined based on a mode that is set for zone group model aggregator 1712 (e.g., a user-driven mode or a data-driven mode). The mode can be set, for example, by a user, automatically by zone group aggregation controller 1700 (e.g., based on a determination regarding whether user feedback is expected), by an external system/device, etc. In some embodiments, both the user-driven approach and data-drive approach are utilized. In this case, zone group model aggregator 1712 may determine zone groups based on user feedback and refine the zone groups based on real-time data or vice versa.

In the user-driven approach, zone group model aggregator 1712 can retrieve grouping selections from a user device 1714. User device 1714 may be any type of device that allows a user to select zone groupings. For example, user device 1714 may be a smart phone, a laptop, a desktop computer, a smart watch, a tablet, etc. In some embodiments, user device 1714 may include a network interface that facilitates communication between user device 1714 and zone group aggregation controller 1700. For example, user device 1714 may communicate with zone group aggregation controller 1700 via the Internet, via Bluetooth communication, via WiFi, etc.

To obtain the grouping selections, zone group model aggregator 1712 may provide the zone models to user device 1714 such that a user can select what zone models to include in certain zone group models. In some embodiments, zone group model aggregator 1712 may provide a list of the zones associated with the zone models such that a user can select certain zones to include in zone groups. Zone group model aggregator 1712 may include functionality to generate graphical user interfaces (GUIs) that indicate the zones/zone models such that the GUIs can be displayed by user device 1714.

In some embodiments, the zones/zone models are presented to the user via a website accessible by user device 1714. In some embodiments, the zone/zone models are presented to the user via an application installed and/or otherwise accessible by user device 1714. It should be appreciated that the zones/zone models can be provided to the user via user device 1714 in any appropriate fashion for obtaining grouping selections. Advantageously, the user-driven approach can be augmented based on how users desire to view possibilities for zone groupings. This provides the user with flexibility in how zone group selections are made. Moreover, the user may be able to restructure the way they wish to interact with the groups with negligible computational cost/time. Upon the user making a new grouping choice, the aggregation process described below can be reapplied for the new grouping choices.

As for the data-driven approach, zone group model aggregator 1712 may retrieve real-time data from data sources 1716 and/or HVAC equipment 210. The data-driven approach can allow zone groups to change based on current operating conditions and can remove a need for the user to provide manual selections of zone groups. In some embodiments, zone group model aggregator 1712 may utilize forms of data other than real-time data in the data-drive approach. For example, zone group model aggregator 1712 may utilize data stored in a database that illustrates changes in zone dynamics over time. However, real-time data may be a preferred form of data for the data-driven approach.

The real-time data collected by zone group model aggregator 1712 can include any data relevant to identifying appropriate zone groupings. For example, the real-time data may include a current operating mode (e.g., heating or cooling) for zones, occupancy information, bounds for zones, state space system parameters, operating setpoints of HVAC equipment 210 and/or other building equipment, etc. In some embodiments, zone group model aggregator 1712 is automatically provided the real-time data from data sources 1716 and/or HVAC equipment 210. Data sources 1716 can include any relevant sources of real-time data that may be applicable to automatically identifying zone groups. For example, data source 1716 may include sensors (e.g., temperature sensors, occupancy sensors, visual cameras, etc.), various building devices, weather services, external controllers/systems/devices, etc.

Based on the real-time data (and/or other data), zone group model aggregator 1712 can perform a zone group identification process to determine what zones should be included in particular zone groups. The zone group identification process may include executing a predefined algorithm that accepts the real-time data as inputs and outputs appropriate zone groups. In some embodiments, zone group model aggregator 1712 may utilize an artificial intelligence model (e.g., a neural network model) to identify appropriate zone groups. Automatic identification of appropriate zone groups may occur, for example, on each run of an MPC algorithm, after a predefined amount of time, after a certain amount of new data (e.g., one gigabyte of data) is obtained, etc.

As a simplistic example of grouping zones in the data-driven approach, the zone group identification process may include grouping zones based on an operating mode. In the example, zone group model aggregator 1712 may utilize the real-time data to determine what zones are in a heating mode and what zones are in a cooling mode. Based on said determination, zone group model aggregator 1712 can generate two zone groups such that a first zone group includes all zones in heating mode and a second zone group includes all zones in cooling mode. It should be noted that this grouping strategy may result in a single zone group if all zones are exclusively in either the heating mode or cooling mode.

In some embodiments, zone group model aggregator 1712 may apply an approach other than the user-driven approach or the data-driven approach. For example, zone group model aggregator 1712 may identify zone groups by performing the peer analysis process described above with reference to FIG. 17. In this case, zone group model aggregator 1712 may include some and/or all of the functionality of model parameter comparator 1114 and/or zone group model generator 1116 as described with reference to FIG. 11.

As a result of applying the user-driven approach and/or the data-driven approach (and/or some other approach), a set of zone groups can be determined such that the aggregation process can be applied. A zone group may include N zones where N>0. An individual zone model (i.e., an individual predictive model) used by zone group model aggregator 1712 may be defined using a state space system representing a thermodynamic process including thermal resistances and capacitances. The thermodynamic process can be represented using conventional circuit theory and, depending on a form, may be capable of reduction to a smaller equivalent form. More particularly, the N zones can be treated as a single aggregate zone group. In such a case, the various thermal resistances and capacitances across each zone and as identified by a respective zone model can be combined via parallel reduction techniques performed by zone group model aggregator 1712 in the aggregation process. In particular, zone group model aggregator 1712 can utilize the following equations to aggregate model parameters of the zone models:

$$R_{oi}^{(p)} = \frac{1}{\sum_{i=1}^{N} \frac{1}{R_{oi}^{(i)}}}$$

$$R_{mi}^{(p)} = \frac{1}{\sum_{i=1}^{N} \frac{1}{R_{mi}^{(i)}}}$$

$$C_{ia}^{(p)} = \sum_{i=1}^{N} C_{ia}^{(i)}$$

$$C_{m}^{(p)} = \sum_{i=1}^{N} C_{m}^{(i)}$$

where $R_{oi}$ is the resistance between indoor air and outdoor air for a zone group, $R_{mi}$ is the resistance between indoor air temperature and mass temperature, $C_{ia}$ is the thermal capacitance of the indoor air, $C_m$ is the thermal capacitance of the mass, (i) represents a parameter from one of the original N zone groups, and (p) resents a parameter for the aggregate zone group. As should be appreciated the above equations are provided purely for sake of example. Zone group model aggregator 1712 may utilize various equations, methods, etc. for generating aggregate zone group models dependent on a form of the zone models. Specifically, an aggregation approach utilized by zone group model aggregator 1712 may be based on what model parameters are included in the zone models. In general, zone group model aggregator 1712 can generate aggregate zone group models by performing some aggregation process on model parameters of zone models associated with zones of a zone group.

Zone group model aggregator 1712 can provide the aggregate zone group models to equipment controller 1118. Based on the aggregate zone group models, equipment controller 1118 can generate control signals for HVAC equipment 210. In this way, HVAC equipment 210 can be operated with respect to the aggregate zone group models rather than individual zone models. This can reduce processing requirements for operating building equipment as fewer models may be utilized as a single aggregate zone group model may account for multiple individual zone models.

Referring now to FIG. 18, a flow diagram of a process 1800 for performing zone group model aggregation is shown, according to some embodiments. Process 1800 can be executed based on a variety of determinations. For example, process 1800 may be executed on each run of an MPC algorithm, after a predefined amount of time, based on an indication provided by a user, based on newly received data, etc. In some embodiments, some and/or all steps of process 1800 are performed by zone group aggregation controller 1700 as described with reference to FIG. 17.

Process 1800 is shown to include obtaining predictive models describing dynamics of building zones (step 1802). The predictive models (i.e., zone models) can be obtained from a variety of sources such as, for example, other controllers, a database, directly from a user, etc. In some embodiments, step 1802 is performed by zone model gathering module 1710 and/or zone group model aggregator 1712.

Process 1800 is shown to include a determination of whether to apply a user-driven approach or a data-driven approach (step 1804). In some embodiments, the determination of step 1804 is based on a mode that may be set by a user, by a controller, etc. In some embodiments, the determination of step 1804 is based on whether any user feedback is expected. Said expectation may be based on information such as whether a user has provided feedback in the past, whether the user has opted out of providing feedback, etc. If the determination in step 1804 is to apply the user-driven approach (step 1804, "User-Driven"), process 1800 can proceed to step 1806. If the determination in step 1804 is to apply the data-driven approach (step 1804, "Data-Driven"), process 1800 can proceed to step 1810. In some embodiments, both the user-driven approach and the data-driven approach are utilized. In this case, a user may provide selections for zone groups which can be modified based on received data (or vice versa). In some embodiments, step 1804 is performed by zone group model aggregator 1712.

Process 1800 is shown to include providing the predictive models to a user device of a user (step 1806). As step 1806 is associated with the user-driven approach, the user may be required to provide feedback on potential zone groupings. Accordingly, the predictive models can be provide to the user device to allow the user to provide their feedback. In some embodiments, the user device is provided with a list of zones separately and/or in addition to the predictive models. In any case, the user device can be provided with information that can allow the user to properly indicate desired zone groupings. In some embodiments, step 1806 is performed by zone group model aggregator 1712.

Process 1800 is shown to include obtaining grouping selections from the user device (step 1808). Based on the predictive models (or zone listing) provided in step 1806, the user can select desired zone groupings via the user device. For example, the user may physically touch a touchscreen of the user device to select specific zones for a zone group. This can be repeated until each zone is a part of a zone group. The zone groups selected by the user can then be obtained for use in process 1800. In some embodiments, step 1808 is performed by zone group model aggregator 1712.

Process 1800 is shown to include obtaining real-time data describing the building zones (step 1810). The real-time data utilized in the data-driven approach may include operational data from building equipment (e.g., HVAC equipment), weather conditions, occupancy information, operating modes for the building equipment (e.g., heating or cooling), state space system parameters, etc. The real-time data can be obtained from a variety of sources such as, for example, other controllers, sensors (e.g., temperature sensors, occupancy sensors, lighting sensors, humidity sensors, pressure sensors, etc.) in zones, weather services, building equipment, etc. In some embodiments, step 1810 is performed by zone group model aggregator 1712.

Process 1800 is shown to include generating aggregate zone group models based on the grouping selections or the real-time data (step 1812). If the user-driven approach is utilized, model parameter aggregation may be performed directly based on the zone groupings provided by the user. If the data-drive approach is utilized, an algorithm may be applied based on the real-time data to determine what zones belong in what zone groups. In either case, once a final set of zone groups is identified, an aggregation process can be performed to generate the aggregate zone group models. In particular, the aggregation process can include aggregating model parameters of zone models within each zone group to calculate composite model parameter values (e.g., via the reduction techniques described above with reference to FIG. 17). As a result of performing step 1812, aggregate zone group models can be acquired that account for dynamics of each zone model therein. In some embodiments, step 1812 is performed by zone group model aggregator 1712.

Process 1800 is shown to include operating building equipment based on the aggregate zone group models (step 1814). In some embodiments, step 1814 includes using the aggregate zone group models in a model predictive control process for the building equipment. In this way, control signals can be generated based on an aggregate zone group model and applied to building equipment for all zones within the aggregate zone group model. In some embodiments, other control processes are applied using the aggregate zone group models. In some embodiments, step 1814 is performed by equipment controller 1118.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A controller for operating building equipment of a building, the controller comprising:
   one or more processors; and one or more non-transitory computer-readable media storing instructions that, when executed by the one or more processors, cause the one or more processors to perform operations comprising:
comparing one or more model parameters of a plurality of predictive models describing zones of the building to determine one or more zone groups for the building;
generating one or more zone group models corresponding to the one or more zone groups; and
operating the building equipment using the one or more zone group models to affect a variable state or condition of the building.

2. The controller of claim 1, the operations further comprising identifying the plurality of predictive models by performing system identification processes based on building information describing the building.

3. The controller of claim 1, wherein generating the one or more zone group models comprises aggregating model parameters of predictive models associated with the zones of the building to generate an aggregate value of each model parameter.

4. The controller of claim 1, wherein generating the one or more zone group models comprises performing one or more system identification processes to identify the one or more zone group models.

5. The controller of claim 1, the operations further comprising:
determining whether to group the one or more zone groups by comparing one or more model parameters of the one or more zone group models; and
in response to a determination to group the one or more zone groups, aggregating the one or more model parameters of the one or more zone group models to generate one or more new zone group models for the building.

6. The controller of claim 1, wherein the one or more model parameters comprise at least one of:
thermal model parameters;
a cooling or heating mode;
an internal heat disturbance; or
a parameter derived from the one or more model parameters.

7. The controller of claim 1, wherein comparing the one or more model parameters comprises at least one of:
calculating a standard deviation of values of the one or more model parameters; or
performing a clustering analysis on the values of the one or more model parameters.

8. A method for operating building equipment of a building, the method comprising:
comparing one or more model parameters of a plurality of predictive models describing zones of the building to determine one or more zone groups for the building;
generating one or more zone group models corresponding to the one or more zone groups; and
operating the building equipment using the one or more zone group models to affect a variable state or condition of the building.

9. The method of claim 8, further comprising identifying the plurality of predictive models by performing system identification processes based on building information describing the building.

10. The method of claim 8, wherein generating the one or more zone group models comprises aggregating model parameters of predictive models associated with the zones of the building to generate an aggregate value of each model parameter.

11. The method of claim 8, wherein generating the one or more zone group models comprises performing one or more system identification processes to identify the one or more zone group models.

12. The method of claim 8, further comprising:
determining whether to group the one or more zone groups by comparing one or more model parameters of the one or more zone group models; and
in response to a determination to group the one or more zone groups, aggregating the one or more model parameters of the one or more zone group models to generate one or more new zone group models for the building.

13. The method of claim 8, wherein the one or more model parameters comprise at least one of:
thermal model parameters;
a cooling or heating mode;
an internal heat disturbance; or
a parameter derived from the one or more model parameters.

14. The method of claim 8, wherein comparing the one or more model parameters comprises at least one of:
calculating a standard deviation of values of the one or more model parameters; or
performing a clustering analysis on the values of the one or more model parameters.

15. A controller for building equipment, the controller comprising a processing circuit configured to perform operations comprising:
identifying a zone group comprising a plurality of zones of a building;
extracting model parameters from a plurality of zone-specific predictive models associated with individual zones of the zone group;
generating a zone group model for the zone group by aggregating the model parameters of the plurality of zone-specific predictive models; and
operating the building equipment using the zone group model to affect a variable state or condition of the building.

16. The controller of claim 15, further comprising generating the plurality of zone-specific predictive models by performing system identification processes based on building information describing the building.

17. The controller of claim 15, wherein identifying the zone group comprises:
receiving grouping selections made by a user from a user device; and
forming the zone group as indicated by the grouping selections.

18. The controller of claim 15, wherein identifying the zone group comprises:
obtaining real-time data describing the plurality of zones; and
forming the zone group based on the real-time data.

19. The controller of claim 15, wherein the real-time data comprises at least one of:
model predictive control setpoints;
a cooling or heating mode;
bounds for the plurality of zones; or
occupancy information.

20. The controller of claim 15, wherein identifying the zone group comprises comparing model parameters of the plurality of zone-specific predictive models to determine which of the plurality of zones exhibit similar behaviors.

* * * * *